United States Patent
Ly et al.

(10) Patent No.: US 10,616,847 B2
(45) Date of Patent: Apr. 7, 2020

(54) TECHNIQUES AND APPARATUSES FOR MULTIPLE TRANSMISSION OF SYNCHRONIZATION SIGNAL BLOCKS IN NEW RADIO

(71) Applicant: QUALCOMM Incorporated, San Diego, CA (US)

(72) Inventors: Hung Ly, San Diego, CA (US); Tao Luo, San Diego, CA (US); Heechoon Lee, San Diego, CA (US); Haitong Sun, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/845,504

(22) Filed: Dec. 18, 2017

(65) Prior Publication Data

US 2018/0184391 A1    Jun. 28, 2018

Related U.S. Application Data

(60) Provisional application No. 62/444,097, filed on Jan. 9, 2017, provisional application No. 62/438,183, filed on Dec. 22, 2016.

(51) Int. Cl.
*H04W 56/00* (2009.01)
*H04W 72/12* (2009.01)
(Continued)

(52) U.S. Cl.
CPC ......... *H04W 56/0045* (2013.01); *H04L 5/005* (2013.01); *H04L 27/2613* (2013.01);
(Continued)

(58) Field of Classification Search
CPC .............. H04W 56/001; H04L 27/261; H04L 27/2613; H04L 27/2655; H04J 11/069
See application file for complete search history.

(56) References Cited

U.S. PATENT DOCUMENTS 7,969,964 B2    6/2011    Kim et al.
8,385,256 B2    2/2013    Kumar et al.
(Continued)

OTHER PUBLICATIONS

R1-161914, "NR Synchronization signals for idle and connected mode mobility", Ericsson, Nov. 14-18, 2016 (Year: 2016).*
(Continued)

*Primary Examiner* — Aristocratis Fotakis
(74) *Attorney, Agent, or Firm* — Harrity & Harrity, LLP

(57) ABSTRACT

Certain aspects of the present disclosure generally relate to wireless communication. In some aspects, a wireless communication device may receive a plurality of synchronization signal blocks, wherein the plurality of synchronization signal blocks include a synchronization signal block and one or more retransmissions of the synchronization signal block that are received in a synchronization interval, and wherein two or more synchronization signal blocks, of the plurality of synchronization signal blocks have a fixed relationship in time. The wireless communication device may determine synchronization information based at least in part on one or more of the plurality of synchronization signal blocks and the fixed relationship in time. Numerous other aspects are provided.

26 Claims, 16 Drawing Sheets

(51) Int. Cl.
*H04W 74/08* (2009.01)
*H04L 27/26* (2006.01)
*H04L 5/00* (2006.01)

(52) U.S. Cl.
CPC ...... *H04L 27/2657* (2013.01); *H04L 27/2692* (2013.01); *H04W 56/0015* (2013.01); *H04W 72/1215* (2013.01); *H04W 74/0841* (2013.01); *H04L 5/0007* (2013.01)

(56) References Cited

U.S. PATENT DOCUMENTS

| | | | |
|---|---|---|---|
| 9,240,816 | B2 | 1/2016 | Nair et al. |
| 9,820,272 | B1* | 11/2017 | Parvazi ................ H04J 11/0069 |
| 2014/0198772 | A1 | 7/2014 | Baldemair et al. |
| 2014/0349645 | A1* | 11/2014 | Webb .................... H04L 5/0091 455/435.1 |
| 2016/0227502 | A1* | 8/2016 | Vos .................... H04W 56/0015 |
| 2016/0277225 | A1 | 9/2016 | Frenne et al. |
| 2016/0360452 | A1* | 12/2016 | Koorapaty ........... H04J 11/0069 |
| 2017/0094624 | A1* | 3/2017 | Balachandran ....... H04W 56/00 |
| 2017/0325184 | A1* | 11/2017 | Kwan ................ H04W 56/001 |
| 2018/0109344 | A1* | 4/2018 | Ly ............................ H04J 11/00 |
| 2018/0109345 | A1* | 4/2018 | Svedman ............. H04J 11/0079 |
| 2018/0123849 | A1* | 5/2018 | Si ........................ H04J 11/0073 |
| 2018/0184390 | A1* | 6/2018 | Wu ........................ H04W 4/70 |
| 2018/0198659 | A1* | 7/2018 | Ko .......................... H04L 5/005 |
| 2018/0227867 | A1* | 8/2018 | Park ....................... H04L 5/005 |
| 2018/0279240 | A1* | 9/2018 | Sheng ................. H04J 11/0069 |
| 2019/0268813 | A1* | 8/2019 | Ramachandra ....... H04W 48/16 |

OTHER PUBLICATIONS

Jyotsna Agrawal, Dr. P. Mor, Dr. J.M. Keller , Dr. P. Dubey, "LTE: User Equipment (UE) States", R.D.V.V. University, Jabalpur (M.P.), India, IARJSET, vol. 3, Special Issue 4, Nov. 2016 (Year: 2016).*
International Search Report and Written Opinion—PCT/US2017/067383—ISA/EPO—dated Mar. 22, 2018.
QUALCOMM Incorporated: "NB-PSS and NB-SSS Design", 3GPP Draft, R1-160105, NB-PSS and NB-SSS Design, 3rd Generation Partnership Project (3GPP), Mobile Competence Centre, 650, Route Des Lucioles, F-06921, Sophia-Antipolis Cedex, France, vol. RAN WG1, No. Budapest, HU, Jan. 18, 2016-Jan. 20, 2016, Jan. 12, 2016, XP051064718, Retrieved from the Internet: URL:http://www.3gpp.org/ftp/tsg_ran/WG1_RL1/TSGR1_AH/LTE_NB-IoT_1691/Docs/ [retrieved on Jan. 12, 2016].

* cited by examiner

TECHNIQUES AND APPARATUSES FOR MULTIPLE TRANSMISSION OF SYNCHRONIZATION SIGNAL BLOCKS IN NEW RADIO

CROSS-REFERENCE TO RELATED APPLICATIONS UNDER 35 U.S.C. § 119

This application claims priority to Provisional Patent Application No. 62/438,183, filed Dec. 22, 2016, entitled "TECHNIQUES AND APPARATUSES FOR MULTIPLE TRANSMISSION OF SYNCHRONIZATION SIGNAL BLOCKS IN NEW RADIO," and to Provisional Patent Application No. 62/444,097, filed Jan. 9, 2017, entitled "TECHNIQUES AND APPARATUSES FOR MULTIPLE TRANSMISSION OF SYNCHRONIZATION SIGNAL BLOCKS IN NEW RADIO," both of which are hereby expressly incorporated by reference herein.

FIELD OF THE DISCLOSURE

Aspects of the present disclosure generally relate to wireless communication, and more particularly to techniques and apparatuses for multiple transmission of synchronization signal blocks in New Radio.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, etc.). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different wireless communication devices to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method for wireless communication may include receiving, by a wireless communication device, a plurality of synchronization signal blocks, wherein the plurality of synchronization signal blocks include a synchronization signal block and one or more retransmissions of the synchronization signal block that are received in a synchronization interval, and wherein two or more synchronization signal blocks, of the plurality of synchronization signal blocks, have a fixed relationship in time. The method may include determining, by the wireless communication device, synchronization information based at least in part on one or more of the plurality of synchronization signal blocks and the fixed relationship in time.

In some aspects, a method for wireless communication may include identifying, by a base station in a first mode, a plurality of synchronization signal blocks, wherein the plurality of synchronization signal blocks include a synchronization signal block and one or more retransmissions of the synchronization signal block, and wherein two or more synchronization signal blocks, of the plurality of synchronization signal blocks, have a fixed relationship in time. The method may include transmitting, by the base station, the plurality of synchronization signal blocks within a synchronization interval and according to the fixed relationship in time, wherein a synchronization interval in the first mode has a first periodicity greater than a synchronization interval in a second mode in which the base station transmits one or more synchronization signal blocks.

In some aspects, a method for wireless communication may include encoding, by a base station, a plurality of synchronization signal blocks, wherein the plurality of synchronization signal blocks include a synchronization signal block and one or more retransmissions of the synchronization signal block, wherein the plurality of synchronization signal blocks are to be transmitted in a synchronization interval, and wherein the plurality of synchronization signal blocks are encoded to enable a combination of the synchronization signal block and one or more retransmissions of the synchronization signal block to be used to identify synchronization information included in the combination of the synchronization signal block and one or more retransmissions of the synchronization signal block. The method may include transmitting, by the base station, the plurality of synchronization signal blocks in the synchronization interval.

In some aspects, a method for wireless communication may include receiving, by a wireless communication device, a plurality of synchronization signal blocks, wherein the plurality of synchronization signal blocks include a synchronization signal block and one or more retransmissions of the synchronization signal block that are received in a synchronization interval. The method may include using, by the wireless communication device, a combination of the plurality of synchronization signal blocks to identify an occurrence of synchronization information. The method may include determining, by the wireless communication device, synchronization information based at least in part on the combination of the plurality of synchronization signal blocks.

In some aspects, a method for wireless communication may include receiving, by a wireless communication device, a plurality of synchronization signal blocks, wherein the plurality of synchronization signal blocks include a synchronization signal block and one or more retransmissions of the synchronization signal block, wherein the plurality of synchronization signal blocks are received in a synchronization interval, and wherein the plurality of synchronization signal blocks are encoded to enable a combination of one or more portions of the synchronization signal block and one or more portions of the one or more retransmissions of the synchronization signal block to be used to identify synchronization information included in the combination of the one or more portions of the synchronization signal block and the one or more portions of the one or more retransmissions of the synchronization signal block. The method may include decoding, by the wireless communication device, the plurality of synchronization signal blocks to identify the synchronization information included in the combination of the synchronization signal block and one or more retransmissions of the synchronization signal block.

In some aspects, a wireless communication device may include a memory and one or more processors coupled to the memory. The one or more processors may be configured to receive a plurality of synchronization signal blocks, wherein the plurality of synchronization signal blocks include a synchronization signal block and one or more retransmissions of the synchronization signal block that are received in a synchronization interval, and wherein two or more synchronization signal blocks, of the plurality of synchronization signal blocks, have a fixed relationship in time. The one or more processors may be configured to determine synchronization information based at least in part on one or more of the plurality of synchronization signal blocks and the fixed relationship in time.

In some aspects, a base station may include a memory and one or more processors coupled to the memory. The one or more processors may be configured to identify, by the base station in a first mode, a plurality of synchronization signal blocks, wherein the plurality of synchronization signal blocks include a synchronization signal block and one or more retransmissions of the synchronization signal block, and wherein two or more synchronization signal blocks, of the plurality of synchronization signal blocks, have a fixed relationship in time. The one or more processors may be configured to transmit the plurality of synchronization signal blocks within a synchronization interval and according to the fixed relationship in time, wherein a synchronization interval in the first mode has a first periodicity greater than a synchronization interval in a second mode in which the base station transmits one or more synchronization signal blocks.

In some aspects, a base station may include a memory and one or more processors coupled to the memory. The one or more processors may be configured to encoding a plurality of synchronization signal blocks, wherein the plurality of synchronization signal blocks include a synchronization signal block and one or more retransmissions of the synchronization signal block, wherein the plurality of synchronization signal blocks are to be transmitted in a synchronization interval, and wherein the plurality of synchronization signal blocks are encoded to enable a combination of the synchronization signal block and one or more retransmissions of the synchronization signal block to be used to identify synchronization information included in the combination of the synchronization signal block and one or more retransmissions of the synchronization signal block. The one or more processors may be configured to transmit the plurality of synchronization signal blocks in the synchronization interval.

In some aspects, a wireless communication device may include a memory and one or more processors coupled to the memory. The one or more processors may be configured to receive a plurality of synchronization signal blocks, wherein the plurality of synchronization signal blocks include a synchronization signal block and one or more retransmissions of the synchronization signal block that are received in a synchronization interval. The one or more processors may be configured to use a combination of the plurality of synchronization signal blocks to identify an occurrence of synchronization information. The one or more processors may be configured to determine synchronization information based at least in part on the combination of the plurality of synchronization signal blocks.

In some aspects, a wireless communication device may include a memory and one or more processors coupled to the memory. The one or more processors may be configured to receive a plurality of synchronization signal blocks, wherein the plurality of synchronization signal blocks include a synchronization signal block and one or more retransmissions of the synchronization signal block, wherein the plurality of synchronization signal blocks are received in a synchronization interval, and wherein the plurality of synchronization signal blocks are encoded to enable a combination of one or more portions of the synchronization signal block and one or more portions of the one or more retransmissions of the synchronization signal block to be used to identify synchronization information included in the combination of the one or more portions of the synchronization signal block and the one or more portions of the one or more retransmissions of the synchronization signal block. The one or more processors may be configured to decode the plurality of synchronization signal blocks to identify the synchronization information included in the combination of the synchronization signal block and one or more retransmissions of the synchronization signal block.

In some aspects, a non-transitory computer-readable medium may store one or more instructions that, when executed by one or more processors of a wireless communication device, may cause the one or more processors to receive a plurality of synchronization signal blocks, wherein the plurality of synchronization signal blocks include a synchronization signal block and one or more retransmissions of the synchronization signal block that are received in a synchronization interval, and wherein two or more synchronization signal blocks, of the plurality of synchronization signal blocks, have a fixed relationship in time. The one or more instructions, when executed by the one or more processors, may cause the one or more processors to determine synchronization information based at least in part on one or more of the plurality of synchronization signal blocks and the fixed relationship in time.

In some aspects, a non-transitory computer-readable medium may store one or more instructions that, when executed by one or more processors of a base station, may cause the one or more processors to identify, by the base station in a first mode, a plurality of synchronization signal blocks, wherein the plurality of synchronization signal blocks include a synchronization signal block and one or more retransmissions of the synchronization signal block, and wherein two or more synchronization signal blocks, of the plurality of synchronization signal blocks, have a fixed relationship in time. The one or more instructions, when executed by the one or more processors, may cause the one or more processors to transmit the plurality of synchronization signal blocks within a synchronization interval and according to the fixed relationship in time, wherein a synchronization interval in the first mode has a first periodicity greater than a synchronization interval in a second mode in which the base station transmits one or more synchronization signal blocks.

In some aspects, a non-transitory computer-readable medium may store one or more instructions that, when executed by one or more processors of a base station, may cause the one or more processors to encode a plurality of synchronization signal blocks, wherein the plurality of synchronization signal blocks include a synchronization signal block and one or more retransmissions of the synchronization signal block, wherein the plurality of synchronization signal blocks are to be transmitted in a synchronization interval, and wherein the plurality of synchronization signal blocks are encoded to enable a combination of the synchronization signal block and one or more retransmissions of the synchronization signal block to be used to identify synchronization information included in the combination of the synchronization signal block and one or more retransmissions of the synchronization signal block. The one or more instructions, when executed by the one or more processors, may cause the one or more processors to transmit the plurality of synchronization signal blocks in the synchronization interval.

In some aspects, a non-transitory computer-readable medium may store one or more instructions that, when executed by one or more processors of a wireless communication device, may cause the one or more processors to receive a plurality of synchronization signal blocks, wherein the plurality of synchronization signal blocks include a synchronization signal block and one or more retransmissions of the synchronization signal block that are received in a synchronization interval. The one or more instructions, when executed by the one or more processors, may cause the one or more processors to use a combination of the plurality of synchronization signal blocks to identify an occurrence of synchronization information. The one or more instructions, when executed by the one or more processors, may cause the one or more processors to determine synchronization information based at least in part on the combination of the plurality of synchronization signal blocks.

In some aspects, a non-transitory computer-readable medium may store one or more instructions that, when executed by one or more processors of a wireless communication device, may cause the one or more processors to receive a plurality of synchronization signal blocks, wherein the plurality of synchronization signal blocks include a synchronization signal block and one or more retransmissions of the synchronization signal block, wherein the plurality of synchronization signal blocks are received in a synchronization interval, and wherein the plurality of synchronization signal blocks are encoded to enable a combination of one or more portions of the synchronization signal block and one or more portions of the one or more retransmissions of the synchronization signal block to be used to identify synchronization information included in the combination of the one or more portions of the synchronization signal block and the one or more portions of the one or more retransmissions of the synchronization signal block. The one or more instructions, when executed by the one or more processors, may cause the one or more processors to decode the plurality of synchronization signal blocks to identify the synchronization information included in the combination of the synchronization signal block and one or more retransmissions of the synchronization signal block.

In some aspects, an apparatus for wireless communication may include means for receiving a plurality of synchronization signal blocks, wherein the plurality of synchronization signal blocks include a synchronization signal block and one or more retransmissions of the synchronization signal block that are received in a synchronization interval, and wherein two or more synchronization signal blocks, of the plurality of synchronization signal blocks, have a fixed relationship in time. The apparatus may include means for determining synchronization information based at least in part on one or more of the plurality of synchronization signal blocks and the fixed relationship in time.

In some aspects, the apparatus may include means for identifying, in a first mode, a plurality of synchronization signal blocks, wherein the plurality of synchronization signal blocks include a synchronization signal block and one or more retransmissions of the synchronization signal block, and wherein two or more synchronization signal blocks, of the plurality of synchronization signal blocks, have a fixed relationship in time. The apparatus may include transmitting, by the base station, the plurality of synchronization signal blocks within a synchronization interval and according to the fixed relationship in time, wherein a synchronization interval in the first mode has a first periodicity greater than a synchronization interval in a second mode in which the apparatus transmits one or more synchronization signal blocks.

In some aspects, the apparatus may include means for encoding a plurality of synchronization signal blocks, wherein the plurality of synchronization signal blocks include a synchronization signal block and one or more retransmissions of the synchronization signal block, wherein the plurality of synchronization signal blocks are to be transmitted in a synchronization interval, and wherein the plurality of synchronization signal blocks are encoded to enable a combination of the synchronization signal block and one or more retransmissions of the synchronization signal block to be used to identify synchronization information included in the combination of the synchronization signal block and one or more retransmissions of the synchronization signal block. The apparatus may include means for transmitting the plurality of synchronization signal blocks in the synchronization interval.

In some aspects, the apparatus may include means for receiving a plurality of synchronization signal blocks, wherein the plurality of synchronization signal blocks include a synchronization signal block and one or more retransmissions of the synchronization signal block that are received in a synchronization interval. The apparatus may include means for using a combination of the plurality of synchronization signal blocks to identify an occurrence of synchronization information. The apparatus may include means for determining synchronization information based at least in part on the combination of the plurality of synchronization signal blocks.

In some aspects, the apparatus may include means for receiving a plurality of synchronization signal blocks, wherein the plurality of synchronization signal blocks include a synchronization signal block and one or more retransmissions of the synchronization signal block, wherein the plurality of synchronization signal blocks are received in a synchronization interval, and wherein the plurality of synchronization signal blocks are encoded to enable a combination of one or more portions of the synchronization signal block and one or more portions of the one or more retransmissions of the synchronization signal block to be used to identify synchronization information included in the combination of the one or more portions of the synchronization signal block and the one or more portions of the one or more retransmissions of the synchronization signal block. The apparatus may include means for decoding the plurality of synchronization signal blocks to identify the synchronization information included in the combination of the synchronization signal block and one or more retransmissions of the synchronization signal block.

Aspects generally include a method, apparatus, system, computer program product, non-transitory computer-readable medium, user equipment, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
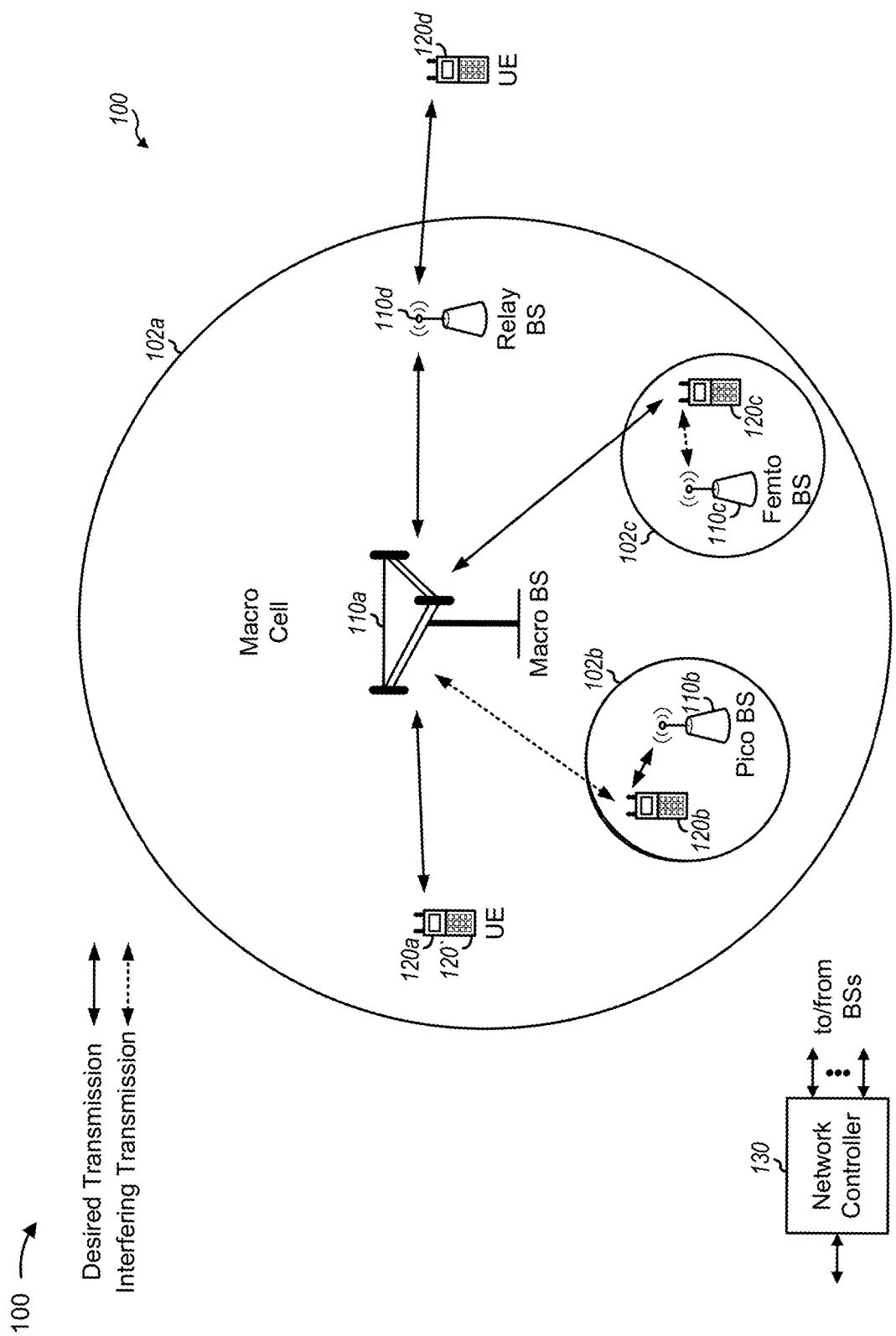
FIG. 1 is a block diagram conceptually illustrating an example of a wireless communication network, in accordance with various aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over another aspect. Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

An access point (AP) may comprise, be implemented as, or known as NodeB, Radio Network Controller (RNC), eNodeB (eNB), Base Station Controller (BSC), Base Transceiver Station (BTS), Base Station (BS), Transceiver Function (TF), Radio Router, Radio Transceiver, Basic Service Set (BSS), Extended Service Set (ESS), Radio Base Station (RBS), Node B (NB), gNB, 5G NB, NR BS, Transmit Receive Point (TRP), or some other terminology.

An access terminal (AT) may comprise, be implemented as, or be known as an access terminal, a subscriber station, a subscriber unit, a mobile station, a remote station, a remote terminal, a user terminal, a user agent, a user device, user equipment (UE), a user station, a wireless node, or some other terminology. In some aspects, an access terminal may comprise a cellular telephone, a smart phone, a cordless telephone, a Session Initiation Protocol (SIP) phone, a wireless local loop (WLL) station, a personal digital assistant (PDA), a tablet, a netbook, a smartbook, an ultrabook, a handheld device having wireless connection capability, a Station (STA), or some other suitable processing device connected to a wireless modem. Accordingly, one or more aspects taught herein may be incorporated into a phone (e.g., a cellular phone, a smart phone), a computer (e.g., a desktop), a portable communication device, a portable computing device (e.g., a laptop, a personal data assistant, a tablet, a netbook, a smartbook, an ultrabook), wearable device (e.g., smart watch, smart glasses, smart bracelet, smart wristband, smart ring, smart clothing, etc.), medical devices or equipment, biometric sensors/devices, an entertainment device (e.g., music device, video device, satellite radio, gaming device, etc.), a vehicular component or sensor, smart meters/sensors, industrial manufacturing equipment, a global positioning system device, or any other suitable device that is configured to communicate via a wireless or wired medium. In some aspects, the node is a wireless node. A wireless node may provide, for example, connectivity for or to a network (e.g., a wide area network such as the Internet or a cellular network) via a wired or wireless communication link. Some UEs may be considered machine-type communication (MTC) UEs, which may include remote devices that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example. Examples of MTC devices include sensors, meters, location tags, monitors, drones, robots/robotic devices, etc. MTC UEs, as well as other types of UEs, may be implemented as NB-IoT (narrowband internet of things) devices.

It is noted that while aspects may be described herein using terminology commonly associated with 3G and/or 4G wireless technologies, aspects of the present disclosure can be applied in other generation-based communication systems, such as 5G and later, including NR technologies.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G NB, an access point, a TRP, etc. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB," "base station," "NR BS," "gNB," "TRP," "AP," "node B," "5G NB," and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, etc.

Wireless network 100 may be a heterogeneous network that includes BSs of different types, e.g., macro BSs, pico BSs, femto BSs, relay BSs, etc. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium. Some UEs may be considered evolved or enhanced machine-type communication (eMTC) UEs. MTC and eMTC UEs include, for example, robots, drones, remote devices, such as sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices. Some UEs may be considered a Customer Premises Equipment (CPE). UE 120 may be included inside a housing 120' that houses components of UE 120, such as processor components, memory components, and/or the like.

In FIG. 1, a solid line with double arrows indicates desired transmissions between a UE and a serving BS, which is a BS designated to serve the UE on the downlink and/or uplink. A dashed line with double arrows indicates potentially interfering transmissions between a UE and a BS.

In general, any number of wireless networks may be deployed in a given geographic area. Each wireless network may support a particular RAT and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity and may schedule resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As indicated above, FIG. 1 is provided merely as an example. Other examples are possible and may differ from what was described with regard to FIG. 1.

Figure 2:
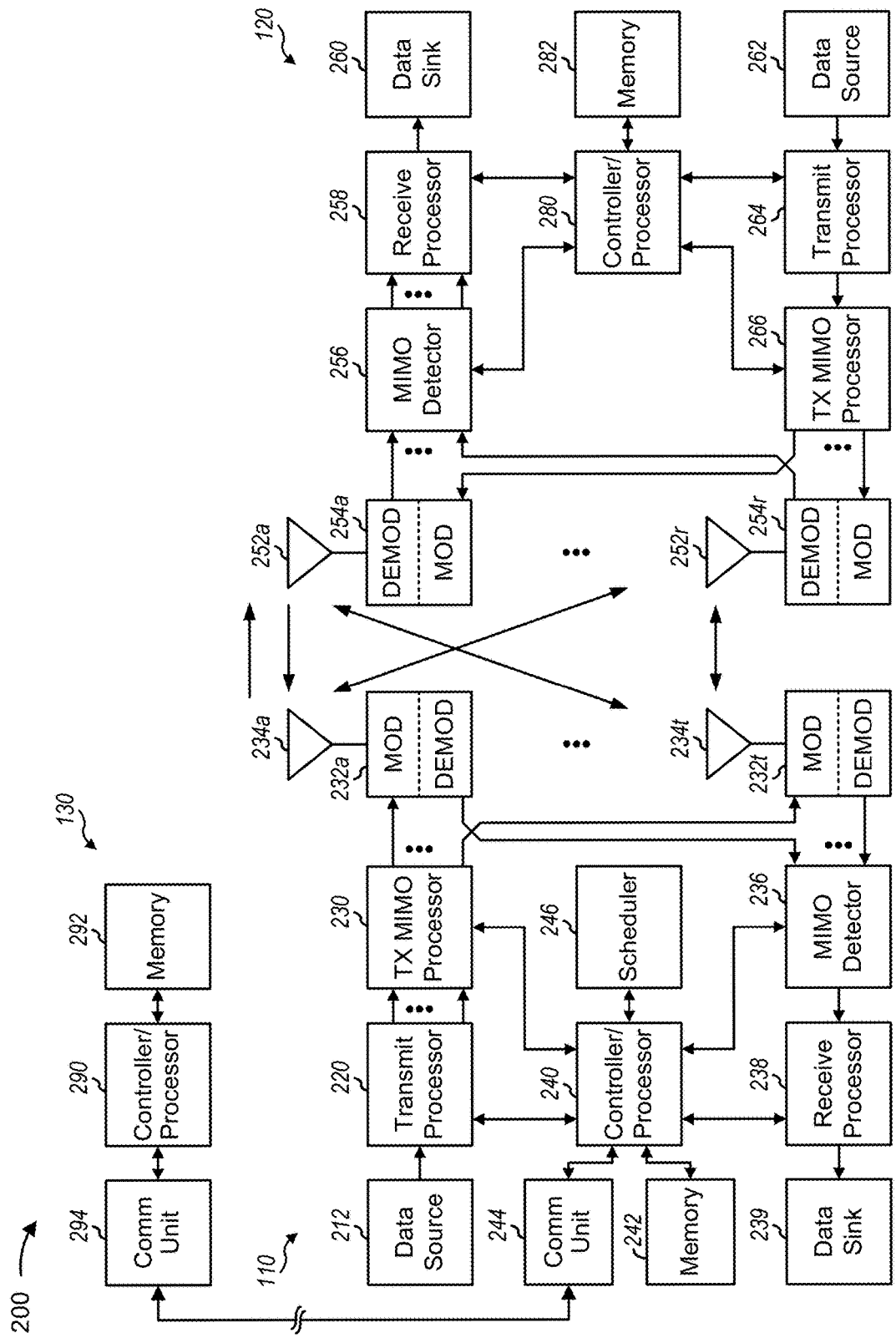
FIG. 2 shows a block diagram conceptually illustrating an example of a base station in communication with a user equipment (UE) in a wireless communication network, in accordance with various aspects of the present disclosure.

FIG. 2 shows a block diagram of a design of BS 110 and UE 120, which may be one of the base stations and one of the UEs in FIG. 1. BS 110 may be equipped with T antennas 234a through 234t, and UE 120 may be equipped with R antennas 252a through 252r, where in general T≥1 and R≥1.

At BS 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), etc.) and control information (e.g., CQI requests, grants, upper layer signaling, etc.) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to certain aspects described in more detail below, the synchronization signals can be generated with location encoding to convey additional information.

At UE 120, antennas 252a through 252r may receive the downlink signals from BS 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), etc.

On the uplink, at UE 120, a transmit processor 264 may receive and process data from a data source 262 and control information (e.g., for reports comprising RSRP, RSSI, RSRQ, CQI, etc.) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, etc.), and transmitted to BS 110. At BS 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. BS 110 may include communication unit 244 and communicate to network controller 130 via communication unit 244. Network controller 130 may include communication unit 294, controller/processor 290, and memory 292.

In some aspects, one or more components of UE 120 may be included in a housing. Controllers/processors 240 and 280 and/or any other component(s) in FIG. 2 may direct the operation at BS 110 and UE 120, respectively, to perform multiple transmission or reception of synchronization signal blocks in new radio. For example, controller/processor 280 and/or other processors and modules at UE 120, may perform or direct operations of UE 120 to perform multiple reception of synchronization signal blocks in new radio. For example, controller/processors 240 and 280 and/or other controllers/processors and modules at BS 110 or UE 120 may perform or direct operations of, for example, example process 1200 of FIG. 12, example process 1300 of FIG. 13, example process 1400 of FIG. 14, example process 1500 of FIG. 15, example process 1600 of FIG. 16, and/or other processes as described herein. In some aspects, one or more of the components shown in FIG. 2 may be employed to perform example process 1200, example process 1300, example process 1400, example process 1500, example process 1600, and/or other processes for the techniques described herein. Memories 242 and 282 may store data and program codes for BS 110 and UE 120, respectively. A scheduler 246 may schedule UEs for data transmission on the downlink and/or uplink.

In some aspects, UE 120 may include means for receiving a plurality of synchronization signal blocks; means for determining synchronization information; means for determining timing associated with at least one of the plurality of synchronization signal blocks; means for using a combination of the plurality of synchronization signal blocks to identify an occurrence of synchronization information; means for determining synchronization information based at least in part on the combination of the plurality of synchronization signal blocks; means for identifying an orthogonal code based at least in part on which the respective plurality of primary synchronization signals are encoded; means for determining a combined primary synchronization signal using the orthogonal code and the respective plurality of primary synchronization signals; means for identifying a first physical broadcast channel transmission of the synchronization signal block according to a time relationship between the combined primary synchronization signal and the synchronization signal block; and/or the like. In some aspects, such means may include one or more components of UE 120 described in connection with FIG. 2.

In some aspects, BS 110 may include means for identifying, in a first mode, a plurality of synchronization signal blocks; means for transmitting the plurality of synchronization signal blocks within a synchronization interval and according to a fixed relationship in time; means for transmitting information regarding the plurality of synchronization signal blocks and/or the fixed relationship in time in one or more system information blocks; means for encoding a plurality of synchronization signal blocks; means for transmitting the plurality of synchronization signal blocks in the synchronization interval; means for encoding respective primary synchronization signals of the plurality of synchronization signal blocks based on an orthogonal code; means for encoding to facilitate detection of at least one peak associated with primary synchronization signals of the plurality of synchronization signal blocks; means for encoding respective physical broadcast channels of the plurality of synchronization signal blocks to enable a combination of the synchronization signal block and one or more retransmissions of the synchronization signal block to be used to identify an index of at least one of the synchronization signal block or a retransmission of the synchronization signal block; means for encoding respective primary synchronization signals of the plurality of synchronization signal blocks based on an orthogonal code; means for encoding to facilitate detection of at least one peak associated with primary synchronization signals of the plurality of synchronization signal blocks; and/or the like. In some aspects, such means may include one or more components of BS 110 described in connection with FIG. 2.

As indicated above, FIG. 2 is provided merely as an example. Other examples are possible and may differ from what was described with regard to FIG. 2.

Figure 3:
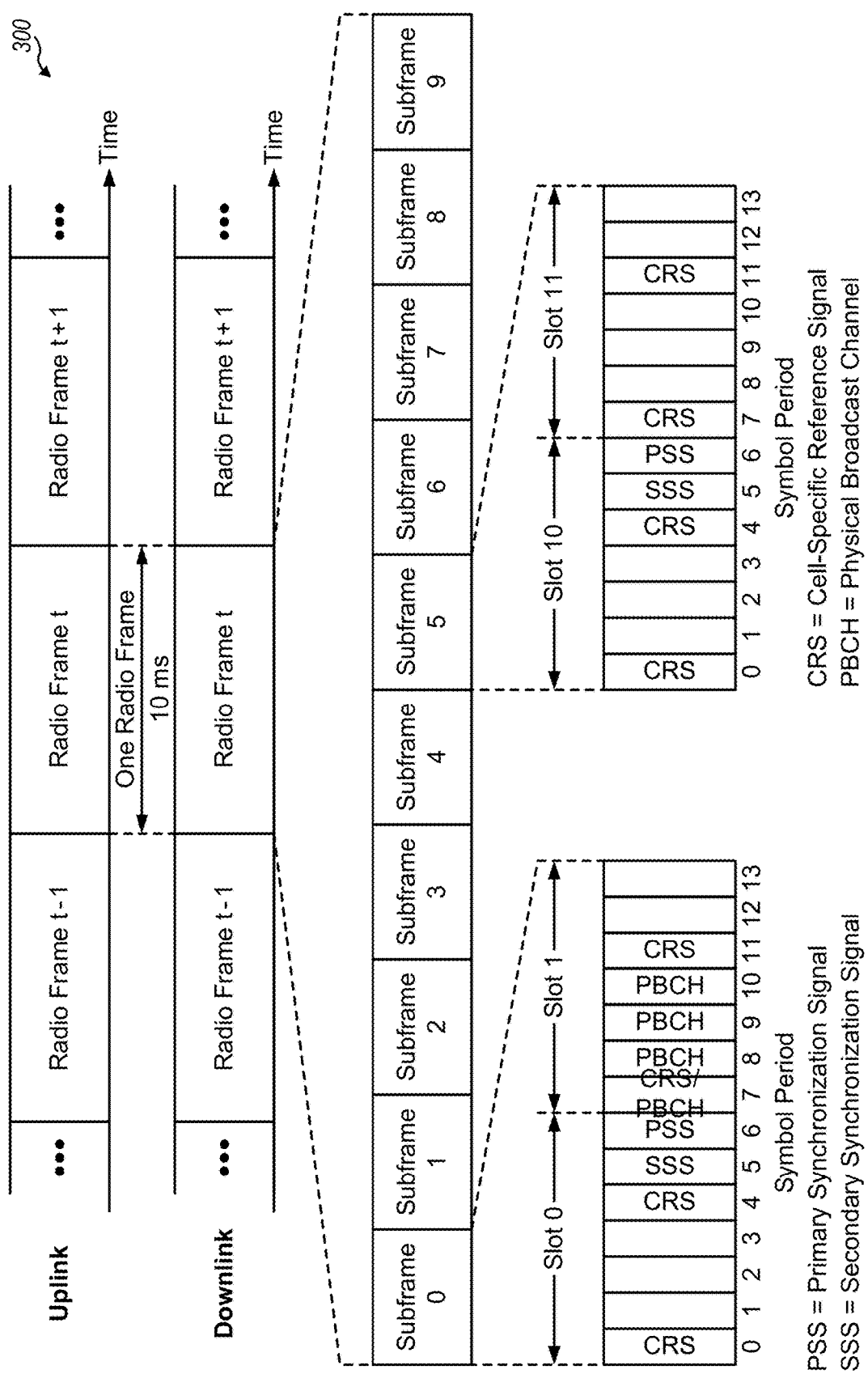
FIG. 3 is a block diagram conceptually illustrating an example of a frame structure in a wireless communication network, in accordance with various aspects of the present disclosure.

FIG. 3 shows an example frame structure 300 for frequency division duplexing (FDD) in a telecommunications system (e.g., LTE). The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L−1.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol.

In certain telecommunications (e.g., LTE), a BS may transmit a primary synchronization signal (PSS) and a secondary synchronization signal (SSS) on the downlink in the center of the system bandwidth for each cell supported by the BS. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The BS may transmit a cell-specific reference signal (CRS) across the system bandwidth for each cell supported by the BS. The CRS may be transmitted in certain symbol periods of each subframe and may be used by the UEs to perform channel estimation, channel quality measurement, and/or other functions. The BS may also transmit a physical broadcast channel (PBCH) in symbol periods 0 to 3 in slot 1 of certain radio frames. The PBCH may carry some system information. The BS may transmit other system information such as system information blocks (SIBs) on a physical downlink shared channel (PDSCH) in certain subframes. The BS may transmit control information/data on a physical downlink control channel (PDCCH) in the first B symbol periods of a subframe, where B may be configurable for each subframe. The BS may transmit traffic data and/or other data on the PDSCH in the remaining symbol periods of each subframe.

In other systems (e.g., such NR or 5G systems), a Node B may transmit these or other signals in these locations and/or in different locations of the subframe or a wireless communications structure. For example, a Node B may transmit a PBCH, a PSS, and/or an SSS as part of one or more synchronization signal blocks, as described in more detail elsewhere herein.

As indicated above, FIG. 3 is provided merely as an example. Other examples are possible and may differ from what was described with regard to FIG. 3.

Figure 4:
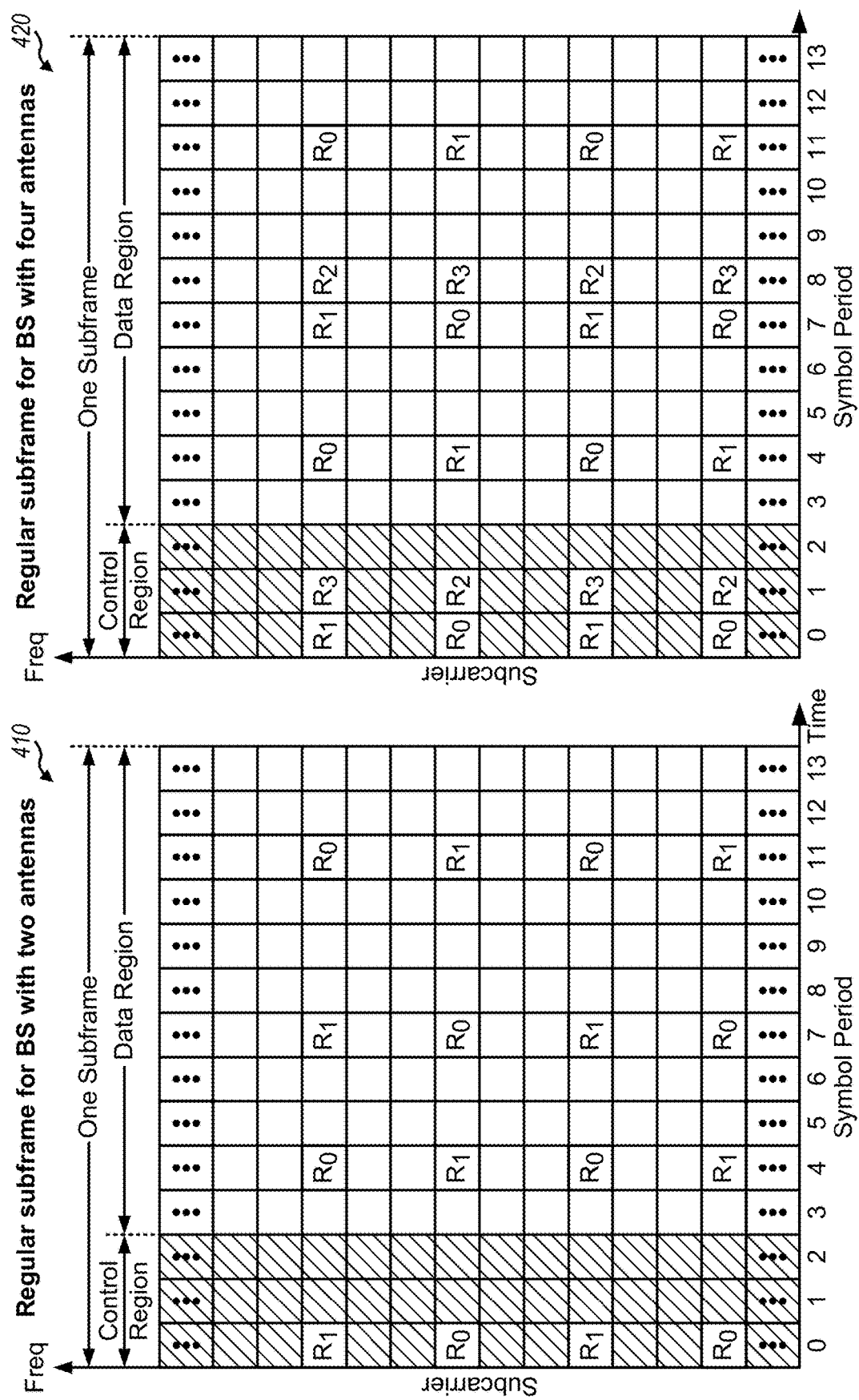
FIG. 4 is a block diagram conceptually illustrating two example subframe formats with the normal cyclic prefix, in accordance with various aspects of the present disclosure.

FIG. 4 shows two example subframe formats 410 and 420 with the normal cyclic prefix. The available time frequency resources may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for two antennas. A CRS may be transmitted from antennas 0 and 1 in symbol periods 0, 4, 7 and 11. A reference signal is a signal that is known a priori by a transmitter and a receiver and may also be referred to as pilot. A CRS is a reference signal that is specific for a cell, e.g., generated based at least in part on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used with four antennas. A CRS may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based at least in part on cell ID. CRSs may be transmitted on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP Technical Specification 36.211, entitled "Evolved Universal Terrestrial Radio Access (E-UTRA); Physical Channels and Modulation," which is publicly available.

An interlace structure may be used for each of the downlink and uplink for FDD in certain telecommunications systems (e.g., LTE). For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

The wireless network may support hybrid automatic retransmission request (HARQ) for data transmission on the downlink and uplink. For HARQ, a transmitter (e.g., a BS) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with LTE technologies, aspects of the present disclosure may be applicable with other wireless communication systems, such as NR or 5G technologies.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

A single component carrier bandwidth of 100 MHZ may be supported. NR resource blocks may span 12 sub-carriers with a sub-carrier bandwidth of 75 kilohertz (kHz) over a 0.1 ms duration. Each radio frame may include 50 subframes with a length of 10 ms. Consequently, each subframe may have a length of 0.2 ms. Each subframe may indicate a link direction (e.g., DL or UL) for data transmission and the link direction for each subframe may be dynamically switched. Each subframe may include DL/UL data as well as DL/UL control data. UL and DL subframes for NR may be as described in more detail below with respect to FIGS. 7 and 8.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

The RAN may include a central unit (CU) and distributed units (DUs). A NR BS (e.g., gNB, 5G Node B, Node B, transmit receive point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases, DCells may not transmit synchronization signals—in some case cases DCells may transmit SS. NR BSs may transmit downlink signals to UEs indicating the cell type. Based at least in part on the cell type indication, the UE may communicate with the NR BS. For example, the UE may determine NR BSs to consider for cell selection, access, handover, and/or measurement based at least in part on the indicated cell type.

As indicated above, FIG. 4 is provided merely as an example. Other examples are possible and may differ from what was described with regard to FIG. 4.

Figure 5:
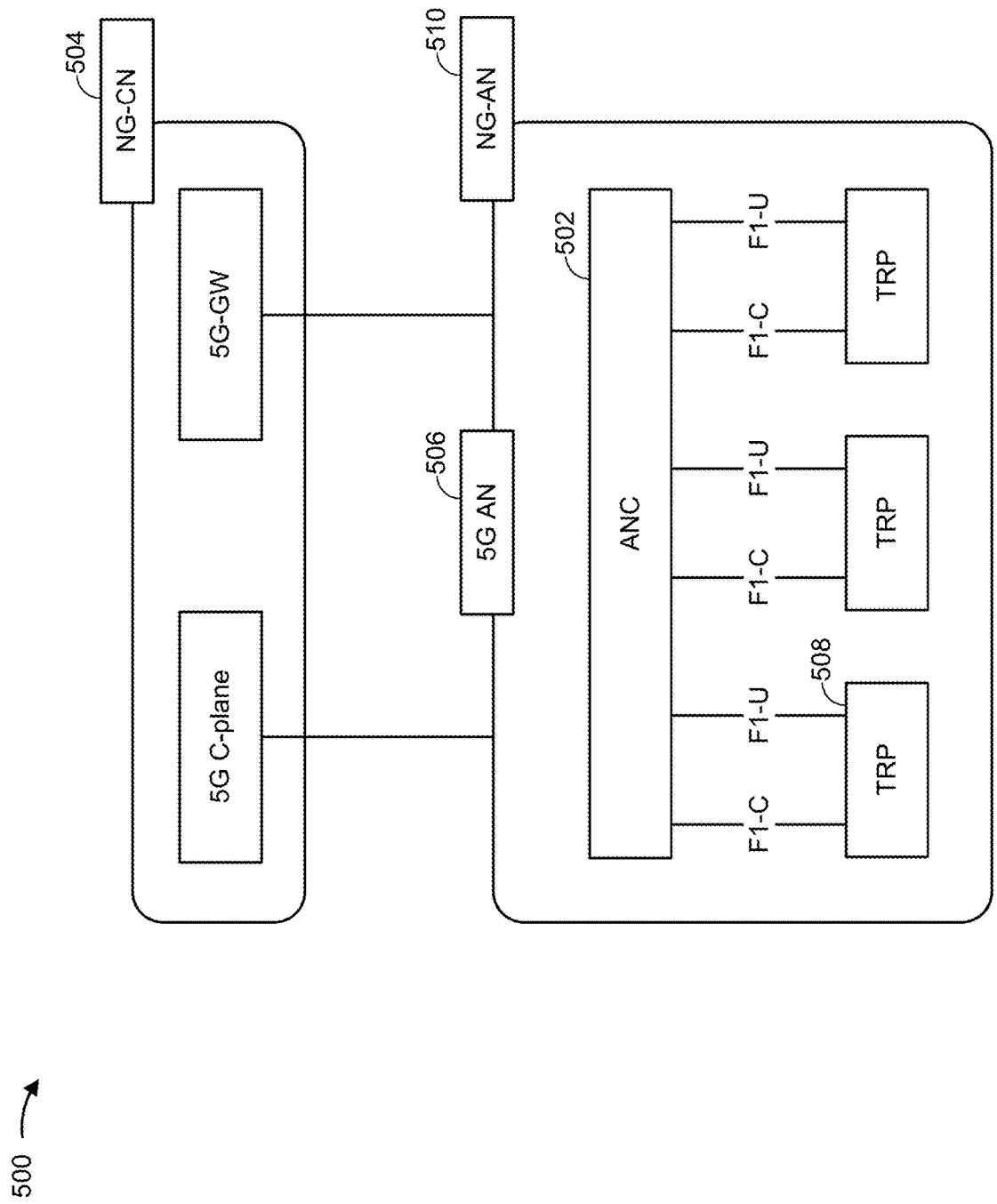
FIG. 5 illustrates an example logical architecture of a distributed radio access network (RAN), in accordance with various aspects of the present disclosure.

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, a TRP may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul definition. The architecture may be defined that support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The Packet Data Convergence Protocol (PDCP), Radio Link Control (RLC), Media Access Control (MAC) protocol may be adaptably placed at the ANC or TRP.

According to certain aspects, a BS may include a central unit (CU) (e.g., ANC 502) and/or one or more distributed units (e.g., one or more TRPs 508).

As indicated above, FIG. 5 is provided merely as an example. Other examples are possible and may differ from what was described with regard to FIG. 5.

Figure 6:
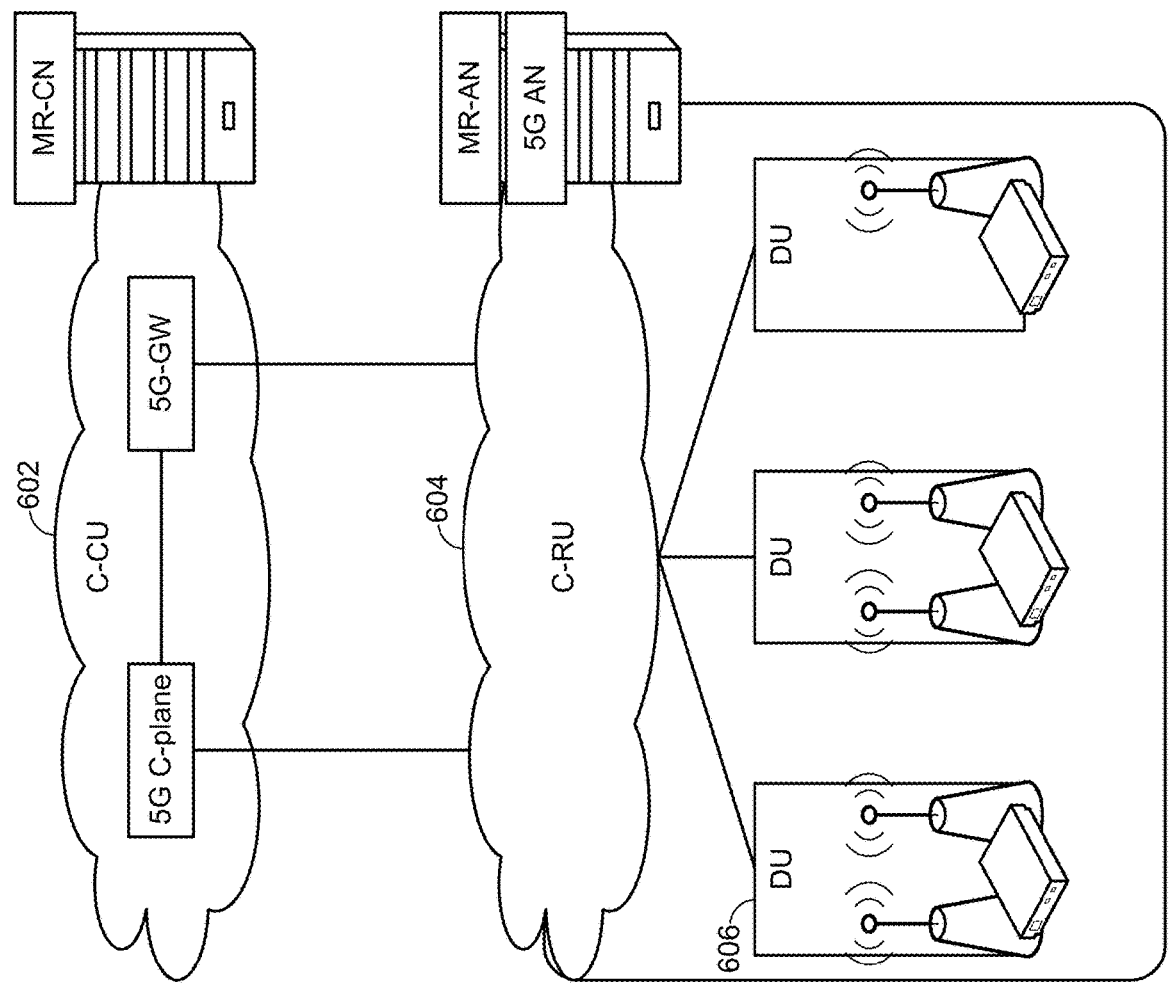
FIG. 6 illustrates an example physical architecture of a distributed RAN, in accordance with various aspects of the present disclosure.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided merely as an example. Other examples are possible and may differ from what was described with regard to FIG. 6.

Figure 7:
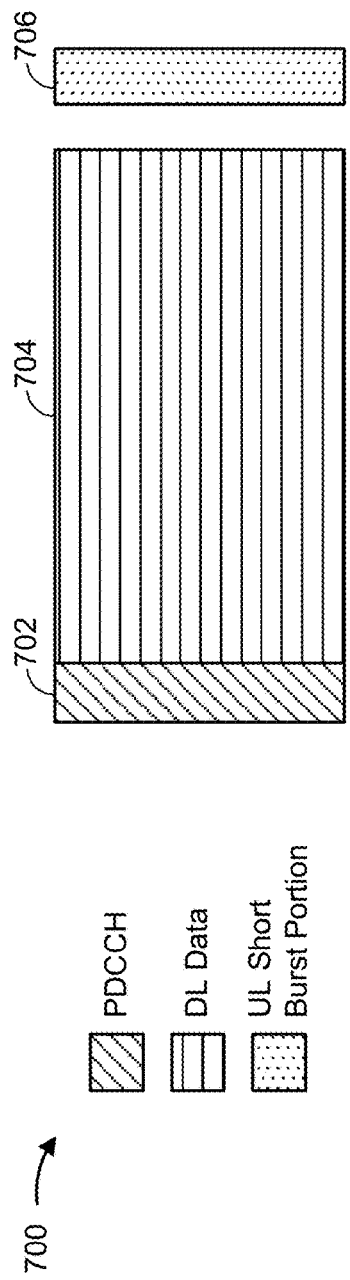
FIG. 7 is a diagram illustrating an example of a downlink (DL)-centric subframe, in accordance with various aspects of the present disclosure.

FIG. 7 is a diagram 700 showing an example of a DL-centric subframe or wireless communication structure. The DL-centric subframe may include a control portion 702. The control portion 702 may exist in the initial or beginning portion of the DL-centric subframe. The control portion 702 may include various scheduling information and/or control information corresponding to various portions of the DL-centric subframe. In some configurations, the control portion 702 may be a physical DL control channel (PDCCH), as indicated in FIG. 7. In some aspects, the control portion may include one or more synchronization signal blocks that include PBCH, PSS, and/or SSS for the UE 120.

The DL-centric subframe may also include a DL data portion 704. The DL data portion 704 may sometimes be referred to as the payload of the DL-centric subframe. The DL data portion 704 may include the communication resources utilized to communicate DL data from the scheduling entity (e.g., UE or BS) to the subordinate entity (e.g., UE). In some configurations, the DL data portion 704 may be a physical DL shared channel (PDSCH).

The DL-centric subframe may also include an UL short burst portion 706. The UL short burst portion 706 may sometimes be referred to as an UL burst, an UL burst portion, a common UL burst, a short burst, an UL short burst, a common UL short burst, a common UL short burst portion, and/or various other suitable terms. In some aspects, the UL short burst portion 706 may include one or more reference signals. Additionally, or alternatively, the UL short burst portion 706 may include feedback information corresponding to various other portions of the DL-centric subframe. For example, the UL short burst portion 706 may include feedback information corresponding to the control portion 702 and/or the data portion 704. Non-limiting examples of information that may be included in the UL short burst portion 706 include an acknowledgment (ACK) signal (e.g., a physical uplink control channel (PUCCH) ACK, a physical uplink shared channel (PUSCH) ACK, an immediate ACK), a negative ACK (NACK) signal (e.g., a PUCCH NACK, a PUSCH NACK, an immediate NACK), a scheduling request (SR), a buffer status report (BSR), a HARQ indicator, a channel state indication (CSI), a channel quality indicator (CQI), a sounding reference signal (SRS), a demodulation reference signal (DMRS), PUSCH data, and/or various other suitable types of information. The UL short burst portion 706 may include additional or alternative information, such as information pertaining to random access channel (RACH) procedures, scheduling requests, and various other suitable types of information.

As illustrated in FIG. 7, the end of the DL data portion 704 may be separated in time from the beginning of the UL short burst portion 706. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). The foregoing is merely one example of a DL-centric wireless communication structure, and alternative structures having similar features may exist without necessarily deviating from the aspects described herein.

As indicated above, FIG. 7 is provided merely as an example. Other examples are possible and may differ from what was described with regard to FIG. 7.

Figure 8:
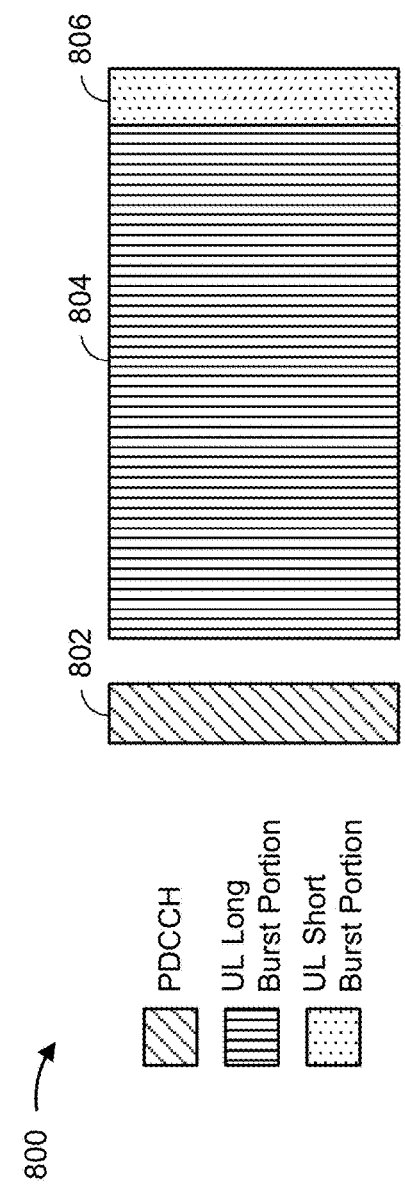
FIG. 8 is a diagram illustrating an example of an uplink (UL)-centric subframe, in accordance with various aspects of the present disclosure.

FIG. 8 is a diagram 800 showing an example of an UL-centric subframe or wireless communication structure. The UL-centric subframe may include a control portion 802. The control portion 802 may exist in the initial or beginning portion of the UL-centric subframe. The control portion 802 in FIG. 8 may be similar to the control portion 702 described above with reference to FIG. 7. The UL-centric subframe may also include an UL long burst portion 804. The UL long burst portion 804 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 802 may be a physical DL control channel (PDCCH).

As illustrated in FIG. 8, the end of the control portion 802 may be separated in time from the beginning of the UL long burst portion 804. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity).

The UL-centric subframe may also include an UL short burst portion 806. The UL short burst portion 806 in FIG. 8 may be similar to the UL short burst portion 706 described above with reference to FIG. 7, and may include any of the information described above in connection with FIG. 7. The foregoing is merely one example of an UL-centric wireless communication structure, and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

In one example, a wireless communication structure, such as a frame, may include both UL-centric subframes and DL-centric subframes. In this example, the ratio of UL-centric subframes to DL-centric subframes in a frame may be dynamically adjusted based at least in part on the amount of UL data and the amount of DL data that are transmitted. For example, if there is more UL data, then the ratio of UL-centric subframes to DL-centric subframes may be increased. Conversely, if there is more DL data, then the ratio of UL-centric subframes to DL-centric subframes may be decreased.

As indicated above, FIG. 8 is provided merely as an example. Other examples are possible and may differ from what was described with regard to FIG. 8.

A BS 110 may transmit synchronization signals (e.g., periodically) to support a UE 120 in time and frequency synchronization, cell identifier detection, beam/TRP identifier detection, and/or the like. For example, the synchronization signals may include a PSS, an SSS, and/or the like. Additionally, the BS 110 may transmit a PBCH (e.g., periodically) to provide the UE 120 with system information, such as a master information block (MIB), which may be used to obtain system information used for random access configuration of the UE 120.

The synchronization signals and/or the PBCH may be transmitted with a frequency (e.g., periodically) in a synchronization interval. The frequency of occurrence of the synchronization interval may be different for different UEs 120 and/or different air interfaces. For example, in New Radio (NR), UEs 120 that are in an radio resource control (RRC) idle mode may use a frequency of occurrence of a synchronization interval that is less than a frequency of occurrence of a synchronization interval used by UEs 120 that are in an RRC connected mode (e.g., a synchronization interval with a greater periodicity than UEs 120 that are in an RRC connected mode). In some aspects, NR may define a synchronization interval of 1-2 ms having a periodicity of 80 ms for PSS, SSS, and PBCH signals for UEs 120 in an RRC idle mode, and may define a synchronization interval having a periodicity of 5 ms for PSS and measurement RS (MRS-S) for UEs 120 in an RRC connected mode. Of course, other periodicities of synchronization intervals and/or larger or smaller synchronization intervals are possible and may be implemented in practice. When a cell includes no UEs 120 in an RRC connected mode, the corresponding BS 110 may transmit only synchronization signals with the larger synchronization interval periodicity corresponding to an RRC idle mode, thereby saving network power and resources.

The UE 120 may perform a synchronization search process to detect the synchronization signals and synchronize with the BS 110 accordingly. However, the latency of this synchronization search process may increase as the synchronization interval periodicity increases, which may be problematic when using a larger synchronization interval periodicity corresponding to an RRC idle mode. Additionally or alternatively, power consumption of the UE 120 may increase for a synchronization search process may increase as the synchronization interval periodicity increases. To reduce the synchronization search latency and/or power consumption, it may be desirable to configure the UE 120 to detect the synchronization signals and complete the synchronization search process within a single synchronization interval.

Aspects described herein retransmit synchronization signals, as part of synchronization signal blocks, one or more times in each synchronization interval. For example, aspects described herein may retransmit a synchronization signal block, as an anchored synchronization signal block, at a configured (e.g., predetermined and/or preconfigured) time in each synchronization interval. Additionally, or alternatively, aspects described herein may retransmit a synchronization signal block one or more times with a predefined time gap between each transmission and retransmission. Additionally, or alternatively, aspects described herein may retransmit a synchronization signal block with index information to enable combining of multiple synchronization signal blocks in the synchronization interval and/or determining of index values of synchronization signal blocks. Additionally, or alternatively, aspects described herein may apply a code to the PSSs (e.g., in a time domain), such as an orthogonal code, to maintain orthogonality at transmission. In this manner, employing such code may minimize false positive synchronization signal matches and assist in identifying an index value of each synchronization signal block. In this way, detection of synchronization signals may be improved, thereby enabling usage of larger synchronization interval periodicity and improving network performance.

Figure 9:
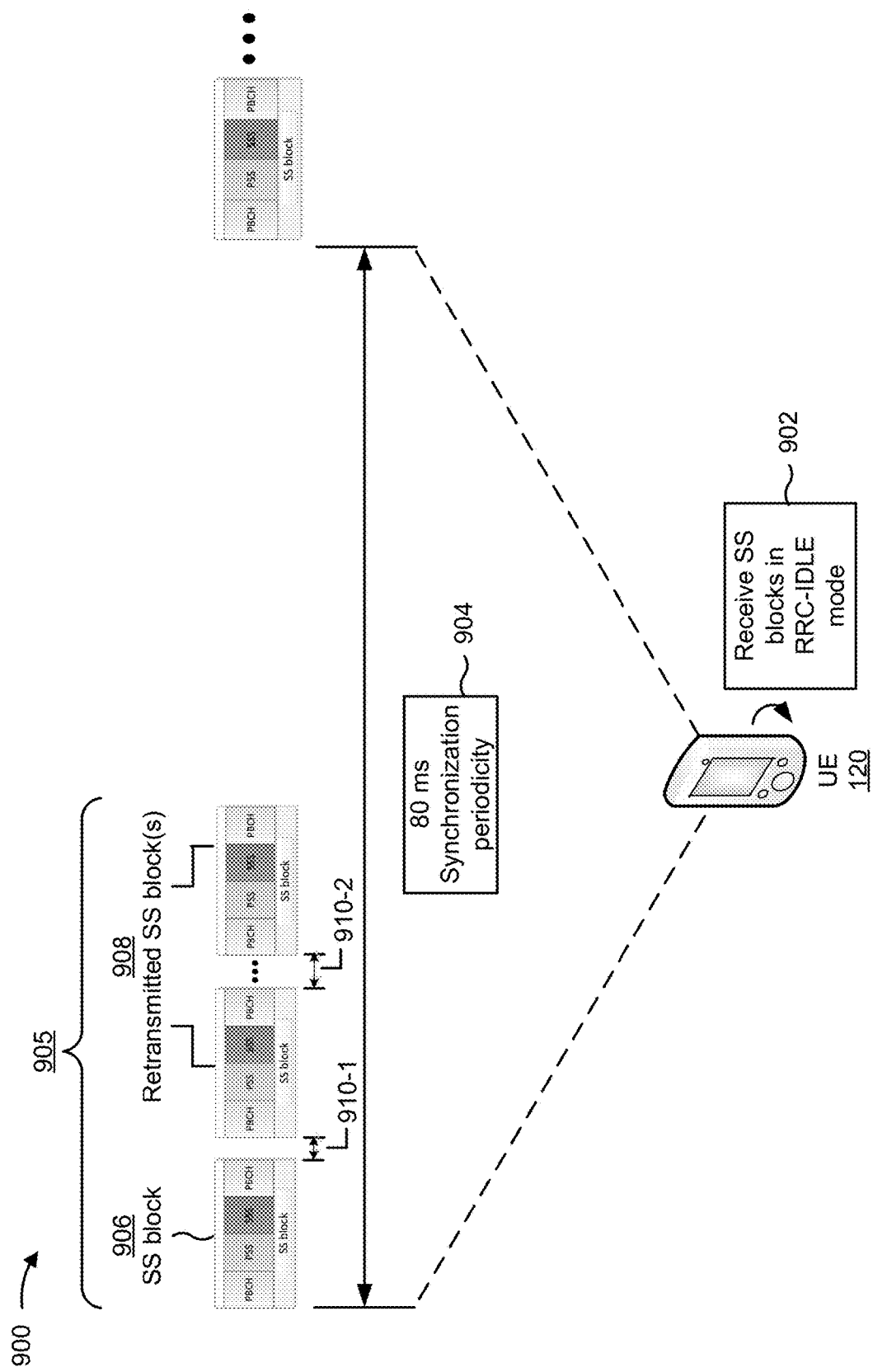
FIG. 9 is a diagram illustrating an example of multiple transmission or reception of synchronization signal blocks in New Radio, in accordance with various aspects of the present disclosure.

FIG. 9 is a diagram illustrating an example 900 of multiple transmission or reception of synchronization signal blocks in New Radio, in accordance with various aspects of the present disclosure.

Figure 10A:
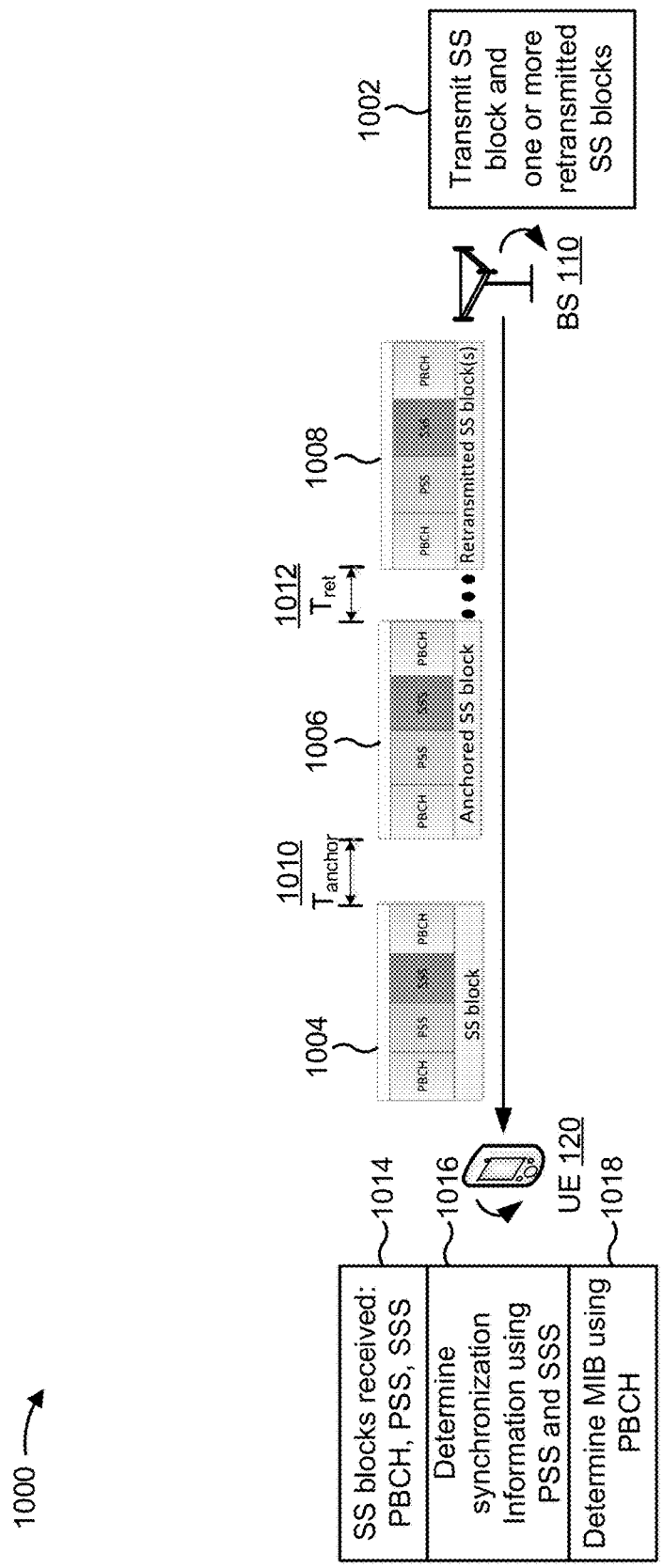
FIGS. 10A and 10B are diagrams illustrating examples of multiple transmission or reception of synchronization signal blocks with a fixed relationship in time in New Radio, in accordance with various aspects of the present disclosure.
Figure 10B:
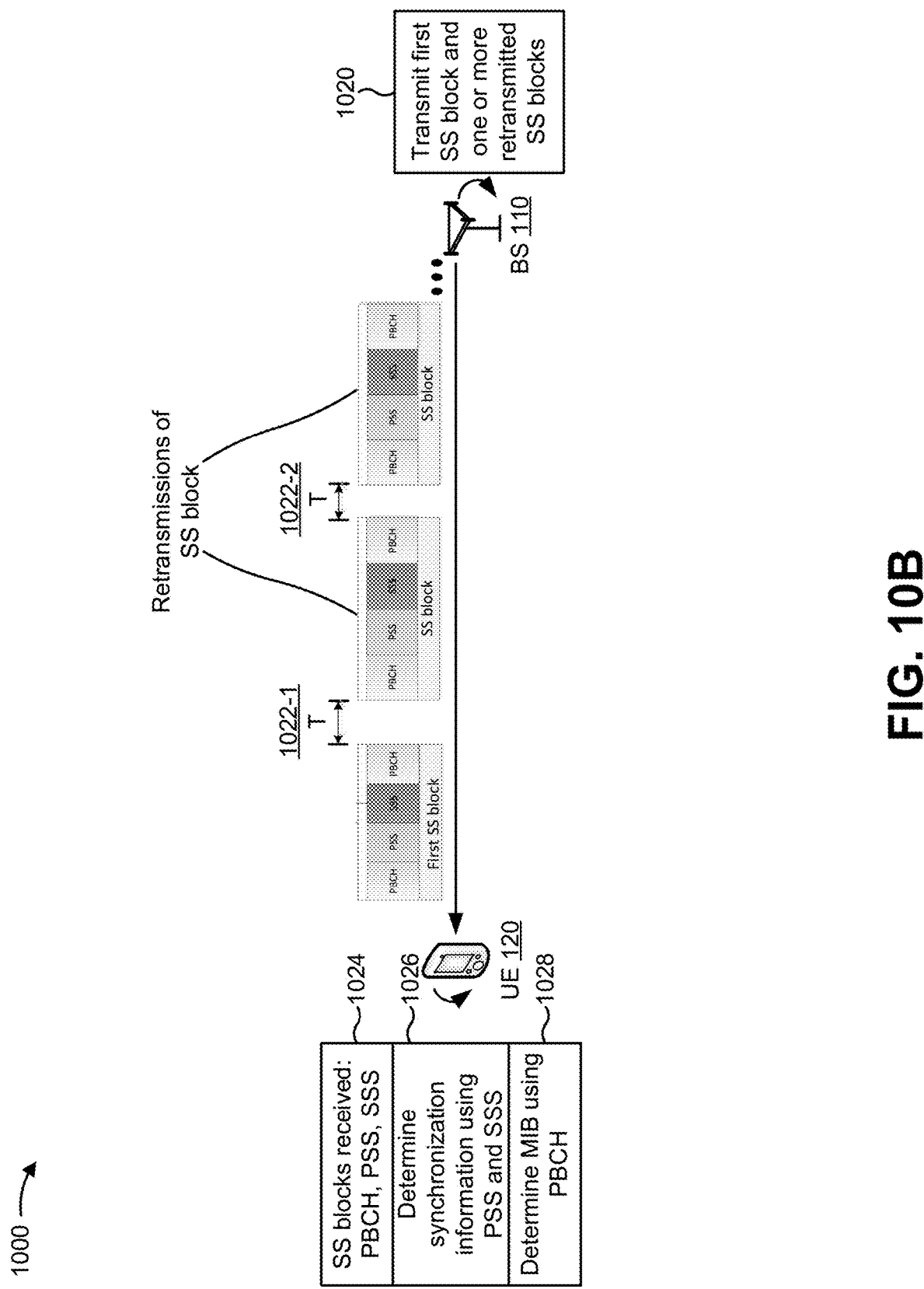
Figure 11:
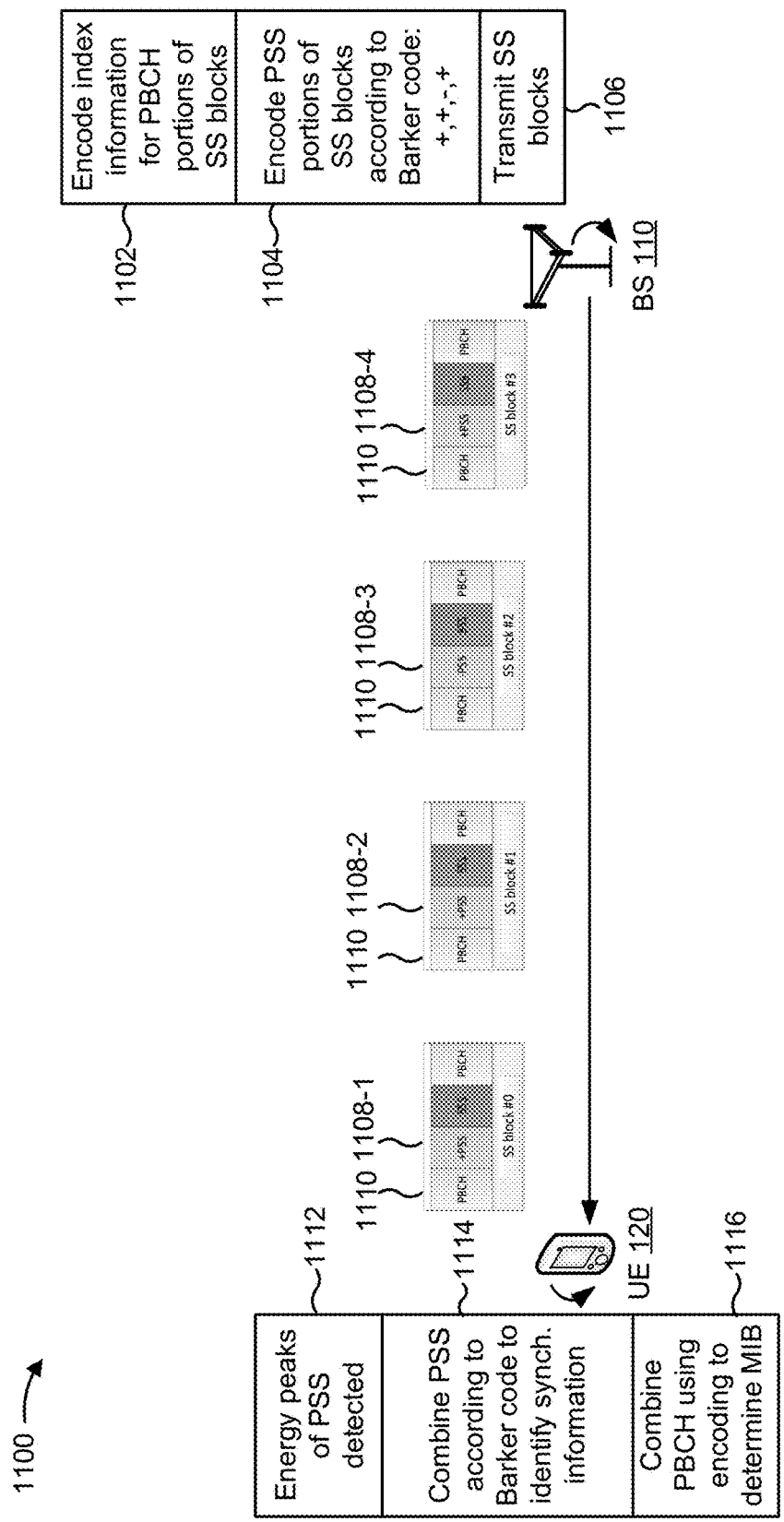
FIG. 11 is a diagram illustrating an example of multiple transmission or reception of synchronization signal blocks with encoding to enable a combination of the synchronization signal blocks, in accordance with various aspects of the present disclosure.

As shown in FIG. 9, and by reference number 902, a UE 120 may receive synchronization signal blocks (shown in FIGS. 9 through 11 as SS blocks). For example, the UE 120 may receive the synchronization signal blocks from a BS 110 that encodes and transmits the synchronization signal blocks. As further shown, the UE 120 may receive the synchronization signal blocks in an RRC idle mode of the UE 120.

As shown by reference number 904, the synchronization signal blocks may be transmitted according to a synchronization periodicity of 80 ms. In some aspects, the synchronization interval 905 of the synchronization signal blocks may have a periodicity that is greater or larger in an RRC idle mode than in an RRC connected mode. For example, the BS 110 may transmit synchronization signal blocks in an interval having a greater periodicity for RRC idle UEs 120 (e.g., every 80 ms), and may transmit synchronization signal blocks in an interval having a smaller periodicity (e.g., every 5 ms) for RRC connected UEs 120. In this way, the BS 110 conserves network power and/or resources. However, transmitting synchronization signal blocks at a larger synchronization interval periodicity (e.g., 80 ms) may introduce additional synchronization search latency and/or UE power consumption to perform (e.g., and complete) the synchronization search.

To reduce synchronization search latency, the BS 110 may transmit a synchronization signal block (shown by reference number 906), and may perform one or more retransmissions of the synchronization signal block (shown by reference number 908). As further shown, the one or more retransmissions of the synchronization signal block may include similar information or the same information as an original transmission of the synchronization signal block (e.g., one or more PBCHs, a PSS, and/or an SSS). In some aspects, parts of the synchronization signal block may be encoded differently in different retransmissions of the synchronization signal block, as described elsewhere herein.

As shown, the synchronization signal blocks include a first PBCH, a PSS, an SSS, and a second PBCH. The first PBCH and/or the second PBCH may carry information regarding a MIB and/or an index value of the corresponding synchronization signal block. The PSS and/or the SSS may have particular energy peaks that allow the UE 120 to detect the PSS and/or the SSS and to synchronize with the BS 110 according to a time at which the PSS and/or the SSS are detected.

As shown by reference numbers 910-1 and 910-2, consecutive pairs of the synchronization signal blocks may be separated by respective time gaps. For example, in some aspects, the consecutive pairs of the synchronization signal blocks may have a fixed relationship in time. In some aspects, as shown and described with regard to FIG. 10A, the fixed relationship in time may be between the first transmission of the synchronization signal block and one retransmission of the synchronization signal block. In some aspects, as shown and described with regard to FIG. 10B, the fixed relationship in time may be between each consecutive pair of synchronization signal blocks. For example, the time gap between each consecutive pair of synchronization signal blocks may be equal. In some aspects, the time gaps may be shorter than the synchronization interval. For example, the time gaps may be substantially zero, approximately 1 ms, approximately 2 ms, approximately 5 ms, a value between zero and approximately 5 ms, and/or the like.

The UE 120 may process and/or decode the synchronization signal blocks to determine synchronization information and/or an MIB of the synchronization signal blocks, as described in connection with FIGS. 10A, 10B, and 11, below. As shown, after the synchronization periodicity, the UE 120 may receive another synchronization signal block corresponding to another synchronization interval (e.g., and one or more retransmissions of the other synchronization signal block).

In some aspects, the retransmissions of the synchronization signal block may be referred to as a synchronization signal burst. A synchronization signal burst may include one or multiple synchronization signal blocks. In some aspects, the synchronization signal burst may start at the radio frames fulfilling $n_f \mod N=0$ (e.g., N=1 or 8). In the radio frames where the synchronization signal blocks are present, the synchronization signal burst may start in the subframes fulfilling $n_{sf}=N_{sf}$ (e.g., $N_{sf}=0$ and/or 5). In some aspects, the maximum number of synchronization signal blocks within a synchronization signal burst may be referred to as $b_{SS}^{max}$. Furthermore, the starting OFDM symbol index of the first synchronization signal block may be referred to as $I_0$, with regard to the numerology of the synchronization. The starting symbol timing index, $I_b$, of synchronization signal block b may be defined with respect to the starting symbol timing index of the first synchronization signal block by $I_b=I_0+4b$, b=0, 1, . . . , $b_{SS}^{max}-1$. Of course, other implementations of symbol index and timing are possible, and may be implemented in practice. Aspects described herein are not limited to the above implementation.

As indicated above, FIG. 9 is provided as an example. Other examples are possible and may differ from what was described with respect to FIG. 9.

FIGS. 10A and 10B are diagrams illustrating examples 1000 of multiple transmission or reception of synchronization signal blocks with a fixed relationship in time in New Radio, in accordance with various aspects of the present disclosure.

As shown in FIG. 10A and, by reference number 1002, a BS 110 may transmit a plurality of synchronization signal blocks including a synchronization signal block and one or more retransmissions of the synchronization signal block. For example, the synchronization signal block is shown by reference number 1004, and the retransmissions of the synchronization signal block are shown by reference numbers 1006 and 1008.

As shown, synchronization signal block 1006 is labeled as an anchored synchronization signal block. An anchored synchronization signal block is a synchronization signal block that is associated with a predetermined or preconfigured time and/or frequency resource or resource index, or is separated from a first transmitted synchronization signal block (e.g., synchronization signal block 1004) by a predefined or configured time interval that is known by the UE 120, shown by reference number 1010 as $T_{anchor}$. In some aspects, $T_{anchor}$ may be substantially zero, approximately 1 ms, approximately 2 ms, approximately 5 ms, a value between zero and approximately 5 ms, and/or the like.

As shown by reference number 1012, retransmissions of the synchronization signal block may be separated by a time $T_{ret}$. In some aspects, $T_{ret}$ may be substantially zero, approximately 1 ms, approximately 2 ms, approximately 5 ms, a value between zero and approximately 5 ms, a value determined as a function of $T_{anchor}$ (e.g., a value equal to $T_{anchor}$, a value greater than $T_{anchor}$, a value less than $T_{anchor}$, a value that is a multiple of $T_{anchor}$, a value that is a divisor of $T_{anchor}$), and/or the like) and/or the like. Additionally, or alternatively, $T_{ret}$ may be different between different consecutive pairs of synchronization signal blocks.

In some aspects, the plurality of synchronization signal blocks may include only two synchronization signal blocks (e.g., synchronization signal blocks 1004 and 1006). For example, the plurality of synchronization signal blocks may include the first synchronization signal block and a single retransmission of the first synchronization signal block, and may not include other retransmissions of the first synchronization signal block.

In some aspects, a quantity of retransmissions of synchronization signal blocks may be configured by BS 110 or another device. For example, BS 110 may use a lower quantity of retransmissions (e.g., zero, one, two, and/or the like) when BS 110 provides a small cell. This may conserve network resources and power that would otherwise be used to provide a higher quantity of retransmissions. As another example, BS 110 may use a higher quantity of retransmissions (e.g., two, three, four, five, and/or the like) when BS 110 provides a large cell. This may improve accuracy of the synchronization process.

As shown by reference number 1014, the UE 120 may receive the plurality of synchronization signal blocks, including the PBCH (e.g., the first PBCH and the second PBCH), the PSS, and the SSS. In some aspects, the UE 120 may receive parts of the synchronization signal blocks or a subset of the synchronization signal blocks, and may combine the parts of the synchronization signal blocks or the subset of the synchronization signal blocks to identify the PBCH, the PSS, and/or the SSS, as described in more detail below.

As shown by reference number 1016, the UE 120 may determine synchronization information using the PSS and/or the SSS. Synchronization information may identify a time of a particular slot and/or subframe of the cellular signal, a physical layer identity, a physical layer cell identity group number, a physical cell identifier at least in part, and/or similar information. In some aspects, the UE 120 may determine the synchronization information using the anchored synchronization signal block 1006 based at least in part on a time associated with the PSS and/or SSS of the anchored synchronization signal block, and a time interval between the anchored synchronization signal block and the first synchronization signal block (e.g., $T_{anchor}$).

As shown by reference number 1018, the UE 120 may determine an MIB using the PBCH (e.g., the first PBCH and/or the second PBCH). The UE 120 may determine the MIB of the PBCH based at least in part on the synchronization information and the PBCH. In some aspects, the UE 120 may identify the PBCH according to a temporal relation between the PBCH and the PSS or SSS. For example, when the UE 120 identifies a time associated with the PSS of the anchored synchronization signal block (e.g., according to the synchronization information), the UE 120 may identify the PBCH of the anchored synchronization signal block according to the temporal relation. In this way, the UE 120 can determine the MIB using the PBCH of the anchored synchronization signal block in a situation, for example, where decoding of the PBCH of the first synchronization signal block is unsuccessful.

In some aspects, the UE 120 may identify the PBCH of the first synchronization signal block based at least in part on a time associated with a PSS of the anchored synchronization signal block, and the time interval $T_{anchor}$. For example, the UE 120 may determine a time associated with the PSS of the first synchronization signal block based at least in part on $T_{anchor}$ and a time associated with the PSS of the anchored synchronization signal block. The UE 120 may use the temporal relation between the PBCH and the PSS to identify the PBCH of the first synchronization signal block in relation to the PSS of the first synchronization signal block. In this way, the UE 120 can determine the MIB in a situation, for example, where detection of the PSS of the first synchronization signal block is unsuccessful.

FIG. 10B shows an example wherein the time gaps between each consecutive pair of synchronization signal blocks are equal. As shown in FIG. 10B, and by reference number 1020, the BS 110 may transmit a plurality of synchronization signal blocks including a synchronization signal block (e.g., a first synchronization signal block) and one or more retransmissions of the synchronization signal block. As shown by reference numbers 1022-1 and 1022-2, in some aspects, each consecutive pair of synchronization signal blocks may be separated by a time gap T. For example, as shown in FIG. 10B, each consecutive pair of synchronization signal blocks may have a fixed relationship in time equal to the time gap T.

In some aspects, the fixed relationship in time may be dependent on, or defined based at least in part on, frequency bands and/or data/control channel numerology of one or more slots in which the synchronization signal blocks are present. For example, the UE 120 may identify a spacing between a first synchronization signal block and a second synchronization signal block according to a difference in frequency band and/or data/control channel numerology of respective slots in which the first synchronization signal block and the second synchronization signal block are transmitted.

In some aspects, a quantity of retransmissions of synchronization signal blocks, and/or spacing of the synchronization signal blocks (e.g., based on time gaps T), may be configured by BS 110 or another device. For example, BS 110 may use a lower quantity of retransmissions (e.g., zero, one, two, and/or the like) and/or a longer spacing when BS 110 provides a small cell. This may conserve network resources and power that would otherwise be used to provide a higher quantity of retransmissions. As another example, BS 110 may use a higher quantity of retransmissions (e.g., two, three, four, five, and/or the like) and/or a shorter spacing when BS 110 provides a large cell. This may improve accuracy of the synchronization process.

As shown by reference number 1024, the UE 120 may receive the synchronization signal blocks. In some aspects, the UE 120 may not receive one or more of the synchronization signal blocks. In such a case, the UE 120 may determine synchronization information and/or an MIB using one or more received synchronization signal blocks, as described in more detail below. Additionally, or alternatively, the UE 120 may receive part of one or more synchronization signal blocks. For example, one or more synchronization signal blocks may be partially corrupted, unusable, or interrupted. In such a case, the UE 120 may determine synchronization information and/or an MIB using one or more usable synchronization signal blocks, as described in more detail below.

As shown by reference number 1026, the UE 120 may determine synchronization information using the PSS and/or the SSS of the synchronization signal blocks, and as shown by reference number 1028, the UE 120 may use the PBCH to determine a MIB. In some aspects, the UE 120 may determine timing associated with at least one of the plurality of synchronization signal blocks based at least in part on timing associated with another one of the plurality of synchronization signal blocks. For example, the UE 120 may identify a time associated with a received synchronization signal block according to a PSS of the received synchronization signal block, and may determine synchronization information for the first synchronization signal block based at least in part on the time associated with the received synchronization signal block and the time gaps T (e.g., by offsetting the time associated with the received synchronization signal block according to a quantity of time gaps T between the received synchronization signal block and the first synchronization signal block).

In some aspects, the synchronization signal blocks (e.g., PBCHs of the synchronization signal blocks) may include respective index values, thus enabling the UE 120 to identify which synchronization signal block, of the plurality of synchronization signal blocks, has been received. This may enable more accurate identification of the first synchronization signal block, for example, in a situation where the third synchronization signal block of a plurality of synchronization signal blocks, and not the second synchronization signal block of the plurality of synchronization signal blocks, is received.

As indicated above, FIGS. 10A and 10B are provided as examples. Other examples are possible and may differ from what was described with respect to FIGS. 10A and 10B.

FIG. 11 is a diagram illustrating an example 1100 of multiple transmission or reception of synchronization signal blocks with encoding to enable a combination of the synchronization signal blocks, in accordance with various aspects of the present disclosure.

As shown in FIG. 11, and by reference number 1102, a BS 110 may encode index information for PBCH portions of a plurality of synchronization signal blocks. For example, the BS 110 may assign respective indexes to the plurality of synchronization signals (e.g., an index value of 0 for a first synchronization signal block, and index values increasing by 1 for subsequent retransmissions of the first synchronization signal block). By encoding the index information for the PBCH portions, the BS 110 may enable a combination of one or more portions of the first synchronization signal block and/or one or more portions of the one or more retransmitted synchronization signal blocks to determine an index of one or more of the plurality of synchronization signal blocks. This, in turn, may enable identification of synchronization information based at least in part on the index, as described below.

As shown by reference number 1104, the BS 110 may encode PSS portions of the plurality of synchronization signal blocks according to a Barker code (e.g., +1, +1, −1, +1). In some aspects, the BS 110 may encode the PSS portions according to a different code, such as any orthogonal code. By encoding the PSS portions according to the code, the BS 110 enables a combination of the first synchronization signal block and the retransmissions of the synchronization signal block to identify synchronization information. For example, the encoding may facilitate detection of at least one energy peak associated with the PSS portions, and may reduce false positive detections of PSS (e.g., based on facilitating detection of the energy peaks).

As shown by reference number 1106, the BS 110 may transmit the plurality of synchronization signal blocks. For example, the BS 110 may transmit the plurality of synchronization signal blocks within a synchronization interval (e.g., 1-2 ms) having an 80 ms periodicity, for example, for a UE 120 in an RRC idle mode. As shown by reference numbers 1108-1 through 1108-4, respective PSS portions of each synchronization signal block may be encoded according to the Barker code. For example, a code [+1, +1, −1, +1] may be applied to the PSS portions respectively in a time domain during transmission. As shown by reference number 1110, each synchronization signal block may include a respective PBCH. As further shown, each synchronization signal block may be associated with a respective index (shown as SS block #0, SS block #1, and so on). This respective index may be added to the PBCH portion and/or encoded in the PBCH portion.

As shown by reference number 1112, the UE 120 may determine or detect the respective energy peaks of the PSS of the plurality of synchronization signal blocks. As shown by reference number 1114, the UE 120 may combine the PSS according to the Barker code to identify synchronization information for the plurality of synchronization signal blocks. For example, the UE 120 may determine a combined PSS using the Barker code and the PSS of the plurality of synchronization signal blocks, and the combined PSS may identify synchronization information for the UE 120 in the synchronization interval. In this way, the UE 120 identifies synchronization information using retransmissions of a synchronization signal block according to Barker encoding of PSS of the synchronization signal block, which reduces occurrence of false identification of the synchronization information (e.g., according to inaccurate identification of the energy peaks associated with the PSS) and, thus, improves network performance.

As shown by reference number 1116, the UE 120 may combine the PBCH of the plurality of synchronization signal blocks, using the encoding of the plurality of the PBCH, to determine the MIB for the first synchronization signal block. In some aspects, the UE 120 may determine the MIB using a temporal relationship between the PBCH and the PSS. For example, the UE 120 may combine the PSS based at least in part on the Barker code to identify synchronization information associated with a combined PSS. The UE 120 may identify the PBCH using a temporal relationship between the synchronization information and the PBCH. For example, the UE 120 may identify a complete or usable PBCH of one or more synchronization signal blocks according to a temporal relationship between PBCH and the combined PSS, and may use the complete or usable PBCH to determine the MIB. In some aspects, the UE 120 may identify incomplete or unusable PBCH of two or more synchronization signal blocks according to a temporal relationship between PBCH and the combined PSS, and may combine the incomplete or unusable PBCH to determine the MIB (e.g., using a soft combination or a similar process).

In some aspects, by decoding the PBCH according to the index information, the UE 120 may identify an index of one or more of the synchronization signal blocks. For example, the UE 120 may not receive one or more of the synchronization signal blocks, or may receive a corrupted or unusable synchronization signal block. In such a case, the UE 120 may identify the PBCH based at least in part on the synchronization information determined according to the PSS, and may combine the PBCH (e.g., using a soft combination process or a similar process) to identify an index of one or more received synchronization signal blocks. The UE 120 may determine synchronization information of the first synchronization signal block according to the index of the one or more received synchronization signal blocks. For example, the UE 120 may use a time relationship between the index and the first synchronization signal block to determine the synchronization information of the first synchronization signal block.

As indicated above, FIG. 11 is provided as an example. Other examples are possible and may differ from what was described with respect to FIG. 11.

Figure 12:
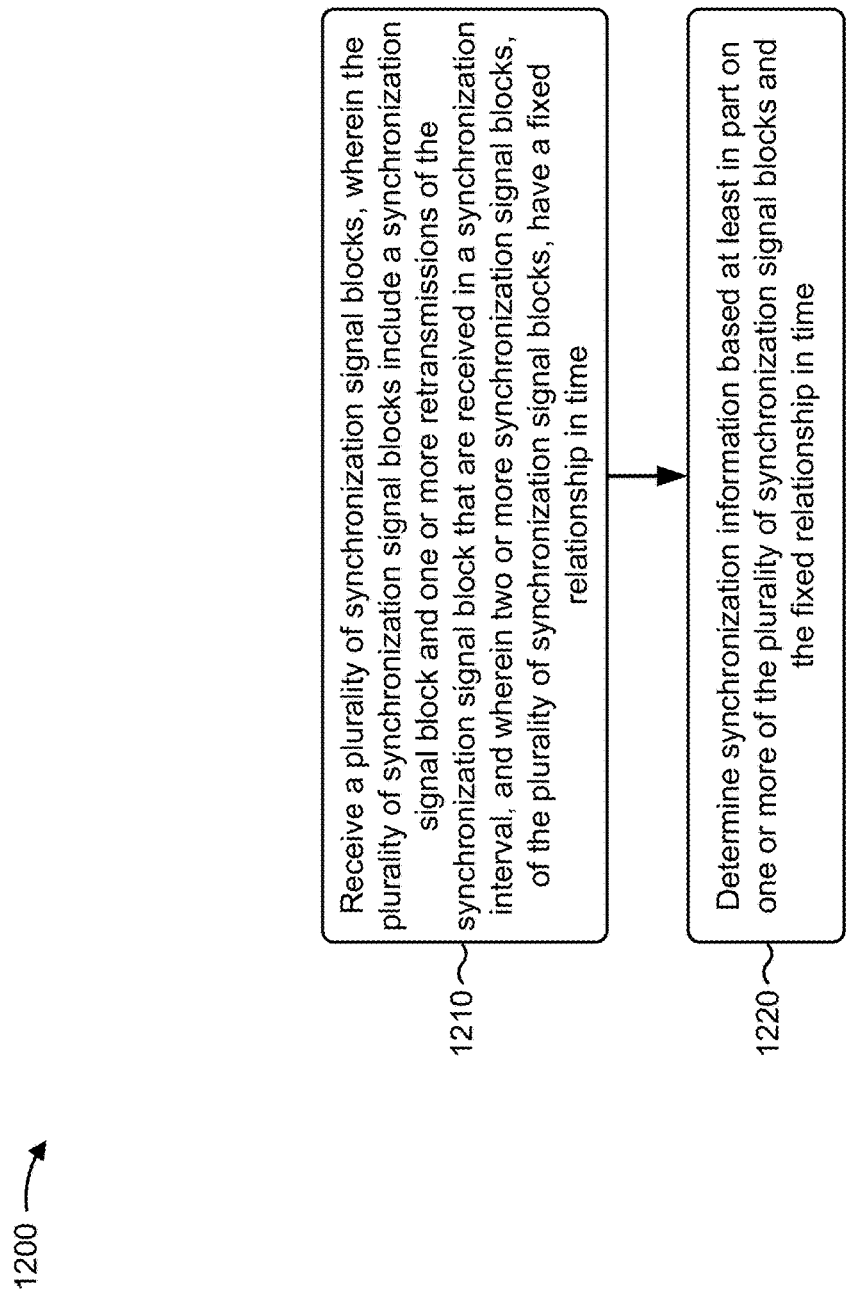
FIG. 12 is a diagram illustrating an example process performed, for example, by a wireless communication device, in accordance with various aspects of the present disclosure.

FIG. 12 is a diagram illustrating an example process 1200 performed, for example, by a wireless communication device, in accordance with various aspects of the present disclosure. Example process 1200 is an example where a wireless communication device (e.g., the UE 120) performs determination of synchronization information based at least in part on one or more of a plurality of synchronization signal blocks and a fixed relationship in time between two or more of the plurality of synchronization signal blocks.

As shown in FIG. 12, in some aspects, process 1200 may include receiving a plurality of synchronization signal blocks, wherein the plurality of synchronization signal blocks include a synchronization signal block and one or more retransmissions of the synchronization signal block that are received in a synchronization interval, and wherein two or more synchronization signal blocks, of the plurality of synchronization signal blocks, have a fixed relationship in time (block 1210). For example, the UE 120 may receive a plurality of synchronization signal blocks, wherein the plurality of synchronization signal blocks include a synchronization signal block and one or more retransmissions of the synchronization signal block that are received in a synchronization interval, and wherein two or more synchronization signal blocks, of the plurality of synchronization signal blocks, have a fixed relationship in time.

In some aspects, the UE 120 may receive the plurality of synchronization signal blocks while operating in a first mode, wherein the synchronization interval in the first mode has a first periodicity greater than a synchronization interval in a second mode in which the UE 120 receives one or more synchronization signal blocks.

In some aspects, the UE 120 may receive the plurality of synchronization signal blocks while operating in a first mode, wherein a first synchronization periodicity of the first mode is greater than a second synchronization periodicity in a second mode in which the UE 120 receives one or more synchronization signal blocks.

In some aspects, one of the synchronization signal block or the one or more retransmissions of the synchronization signal block may be received in at least one of a configured time or configured frequency resource.

In some aspects, the fixed relationship in time may be between the synchronization signal block and one of the one or more retransmissions of the synchronization signal block. In some aspects, the fixed relationship in time may be between each consecutive pair of synchronization signal blocks of the plurality of synchronization signal blocks.

In some aspects, the fixed relationship in time may be dependent on one or more of frequency bands of one or more slots in which the plurality of synchronization signal blocks are present, or data/control channel numerology of the one or more slots in which the plurality of synchronization signal blocks are present.

In some aspects, a particular synchronization signal block, of the plurality of synchronization signal blocks, may include at least one of a primary synchronization signal, a secondary synchronization signal, or a physical broadcast channel.

In some aspects, the UE 120 may be in a radio resource control idle mode, wherein a frequency of the synchronization interval is selected for the radio resource control idle mode. In some aspects, information regarding the plurality of synchronization signal blocks and/or the fixed relationship in time is communicated to the wireless communication device in one or more system information blocks.

As shown in FIG. 12, in some aspects, process 1200 may include determining synchronization information based at least in part on one or more of the plurality of synchronization signal blocks and the fixed relationship in time (block 1220). For example, the UE 120 may determine synchronization information based at least in part on one or more of the plurality of synchronization signal blocks and the fixed relationship in time.

In some aspects, determining the synchronization information may include determining timing associated with at least one of the plurality of synchronization signal blocks based at least in part on timing associated with another one of the plurality of synchronization signal blocks.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
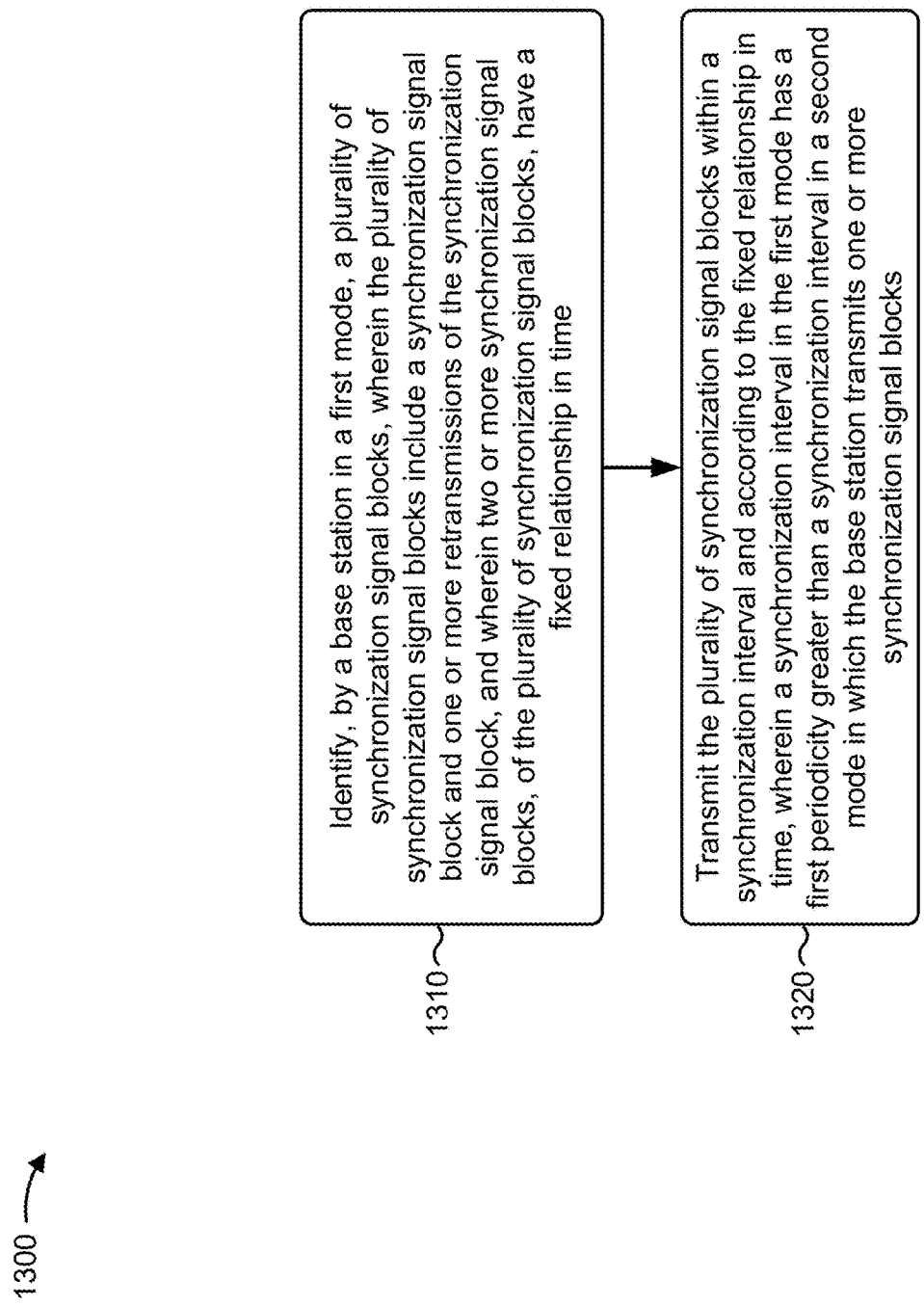
FIG. 13 is a diagram illustrating an example process performed, for example, by a base station, in accordance with various aspects of the present disclosure.

FIG. 13 is a diagram illustrating an example process 1300 performed, for example, by a base station, in accordance with various aspects of the present disclosure. Example process 1300 is an example where a base station (e.g., the BS 110) performs transmission of a plurality of synchronization signal blocks for determination of synchronization information using the plurality of synchronization signal blocks.

As shown in FIG. 13, in some aspects, process 1300 may include identifying, by a base station in a first mode, a plurality of synchronization signal blocks, wherein the plurality of synchronization signal blocks include a synchronization signal block and one or more retransmissions of the synchronization signal block, and wherein two or more synchronization signal blocks, of the plurality of synchronization signal blocks, have a fixed relationship in time (block 1310). For example, the BS 110 may identify, in a first mode, a plurality of synchronization signal blocks, wherein the plurality of synchronization signal blocks include a synchronization signal block and one or more retransmissions of the synchronization signal block, and wherein two or more synchronization signal blocks, of the plurality of synchronization signal blocks, have a fixed relationship in time.

As shown in FIG. 13, in some aspects, process 1300 may include transmitting the plurality of synchronization signal blocks within a synchronization interval and according to the fixed relationship in time, wherein a synchronization interval in the first mode has a first periodicity greater than a synchronization interval in a second mode in which the base station transmits one or more synchronization signal blocks (block 1320). For example, the BS 110 may transmit the plurality of synchronization signal blocks within a synchronization interval and according to the fixed relationship in time, wherein a synchronization interval in the first mode has a first periodicity greater than a synchronization interval in a second mode in which the BS 110 transmits one or more synchronization signal blocks.

In some aspects, the BS 110 may transmit the plurality of synchronization signal blocks within the synchronization interval while operating in a first mode, wherein the synchronization interval while operating in the first mode may have a first periodicity greater than a synchronization interval in a second mode in which the BS 110 transmits one or more synchronization signal blocks.

In some aspects, one of the synchronization signal block or the one or more retransmissions of the synchronization signal block may be transmitted in at least one of a configured time or configured frequency resource.

In some aspects, the fixed relationship in time may be between the synchronization signal block and one of the one or more retransmissions of the synchronization signal block. In some aspects, the fixed relationship in time may be between each consecutive pair of synchronization signal blocks of the plurality of synchronization signal blocks.

In some aspects, the fixed relationship in time may be dependent on one or more of frequency bands of one or more slots in which the plurality of synchronization signal blocks are present, or data/control channel numerology of the one or more slots in which the plurality of synchronization signal blocks are present. In some aspects, the BS may transmit information regarding the plurality of synchronization signal blocks and/or the fixed relationship in time in one or more system information blocks.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
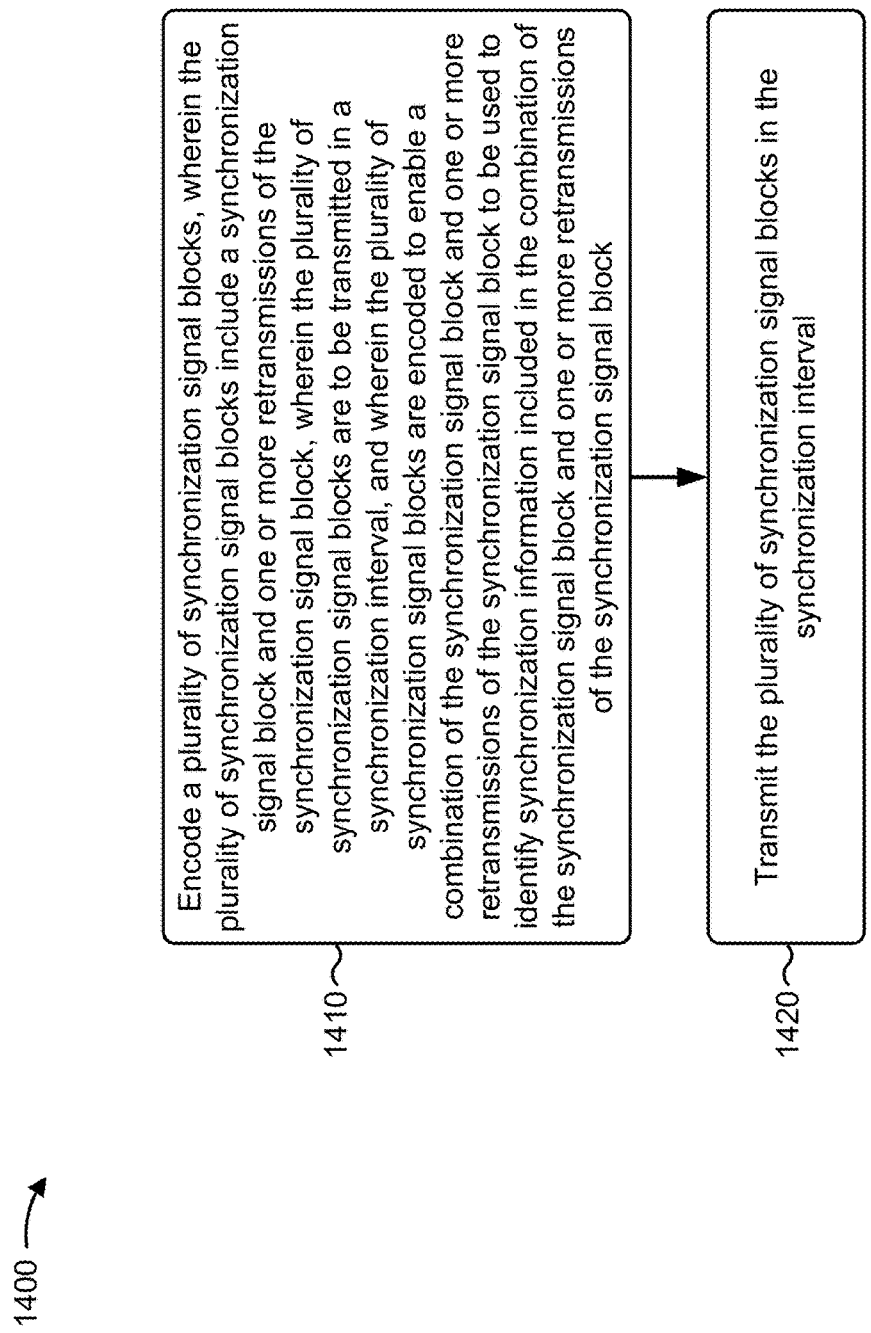
FIG. 14 is a diagram illustrating an example process performed, for example, by a base station, in accordance with various aspects of the present disclosure.

FIG. 14 is a diagram illustrating an example process 1400 performed, for example, by a base station, in accordance with various aspects of the present disclosure. Example process 1400 is an example where a base station (e.g., the BS 110) performs encoding and transmission of synchronization signal blocks to facilitate determination of synchronization information by decoding the synchronization signal blocks.

As shown in FIG. 14, in some aspects, process 1400 may include encoding a plurality of synchronization signal blocks, wherein the plurality of synchronization signal blocks include a synchronization signal block and one or more retransmissions of the synchronization signal block, wherein the plurality of synchronization signal blocks are to be transmitted in a synchronization interval, and wherein the plurality of synchronization signal blocks are encoded to enable a combination of the synchronization signal block and one or more retransmissions of the synchronization signal block to be used to identify synchronization information included in the combination of the synchronization signal block and one or more retransmissions of the synchronization signal block (block 1410). For example, the BS 110 may encode a plurality of synchronization signal blocks, wherein the plurality of synchronization signal blocks include a synchronization signal block and one or more retransmissions of the synchronization signal block, wherein the plurality of synchronization signal blocks are to be transmitted in a synchronization interval, and wherein the plurality of synchronization signal blocks are encoded to enable a combination of the synchronization signal block and one or more retransmissions of the synchronization signal block to be used to identify synchronization information included in the combination of the synchronization signal block and one or more retransmissions of the synchronization signal block.

In some aspects, the BS 110 may transmit the plurality of synchronization signal blocks within the synchronization interval while operating in a first mode, wherein the first mode has a first synchronization periodicity greater than a second synchronization periodicity in a second mode in which the BS 110 transmits one or more synchronization signal blocks.

In some aspects, the BS 110 may encode respective physical broadcast channels of the plurality of synchronization signal blocks to enable a combination of the synchronization signal block and one or more retransmissions of the synchronization signal block to be used to identify an index of at least one of the synchronization signal block or a retransmission of the synchronization signal block.

In some aspects, the BS 110 may encode respective primary synchronization signals of the plurality of synchronization signal blocks based on an orthogonal code. In some aspects, the orthogonal code may include a Barker code. In some aspects, the BS 110 may encode the plurality of synchronization signal blocks to facilitate detection of peaks associated with the primary synchronization signals.

As shown in FIG. 14, in some aspects, process 1400 may include transmitting the plurality of synchronization signal blocks in the synchronization interval (block 1420). For example, the BS 110 may transmit the plurality of synchronization signal blocks in the synchronization interval. In some aspects, the BS 110 may transmit the plurality of synchronization signal blocks within the synchronization interval while operating in a first mode, wherein the synchronization interval while operating in the first mode has a first periodicity greater than a synchronization interval in a second mode in which the base station transmits one or more synchronization signal blocks.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

Figure 15:
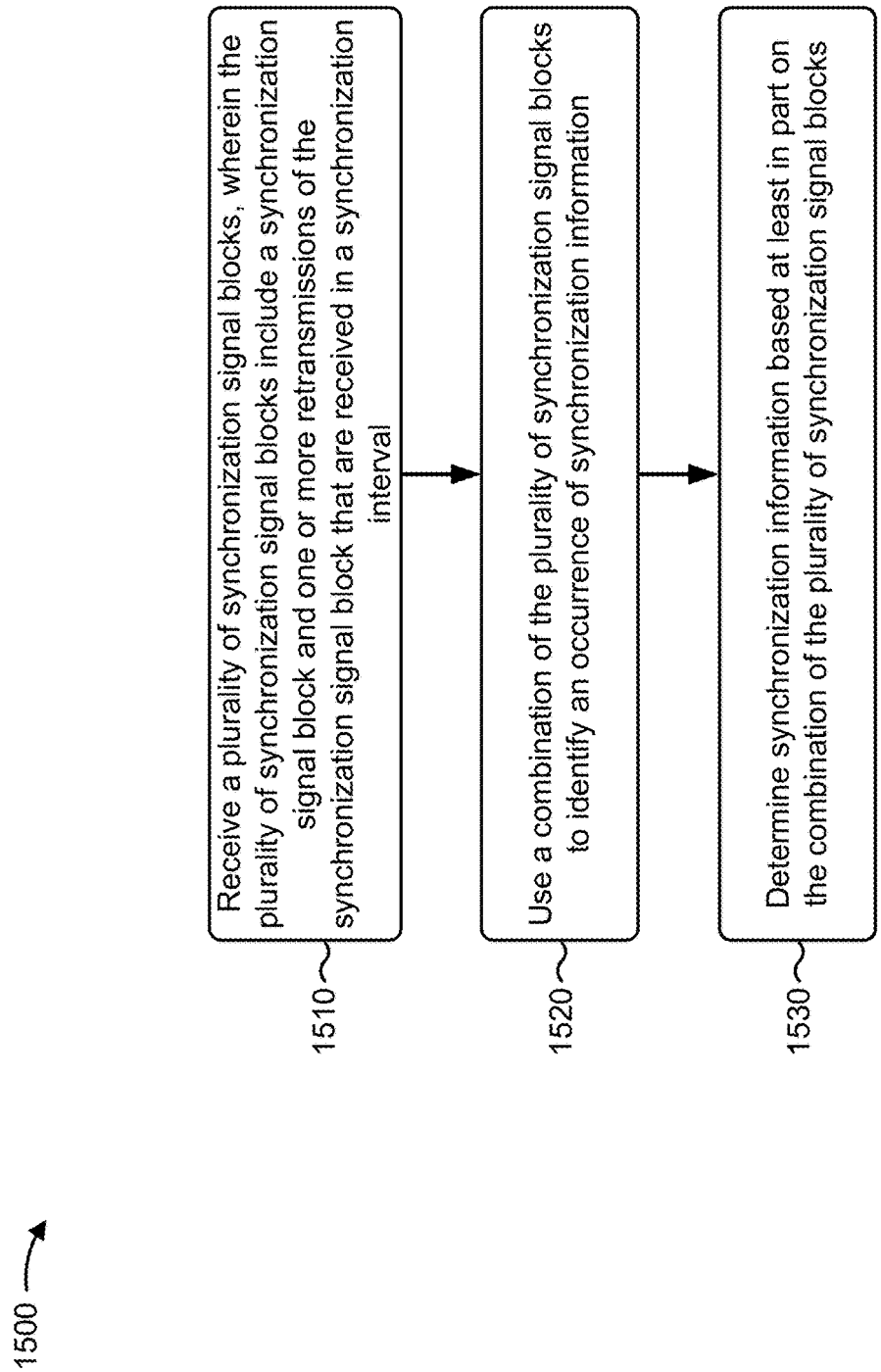
FIG. 15 is a diagram illustrating an example process performed, for example, by a wireless communication device, in accordance with various aspects of the present disclosure.

FIG. 15 is a diagram illustrating an example process 1500 performed, for example, by a wireless communication device, in accordance with various aspects of the present disclosure. Example process 1500 is an example where a wireless communication device (e.g., the UE 120) performs determination of synchronization information based at least in part on combining a plurality of synchronization signal blocks.

As shown in FIG. 15, in some aspects, process 1500 may include receiving a plurality of synchronization signal blocks, wherein the plurality of synchronization signal blocks include a synchronization signal block and one or more retransmissions of the synchronization signal block that are received in a synchronization interval (block 1510). For example, the UE 120 may receive a plurality of synchronization signal blocks, wherein the plurality of synchronization signal blocks include a synchronization signal block and one or more retransmissions of the synchronization signal block that are received in a synchronization interval.

In some aspects, the plurality of synchronization signal blocks may include respective index values, wherein the combination is to be determined based at least in part on the respective index values.

As shown in FIG. 15, in some aspects, process 1500 may include using a combination of the plurality of synchronization signal blocks to identify an occurrence of synchronization information (block 1520). For example, the UE 120 may use a combination of the plurality of synchronization signal blocks to identify an occurrence of synchronization information.

In some aspects, the plurality of synchronization signal may include a respective plurality of physical broadcast channel transmissions and a respective plurality of primary synchronization signals. The UE 120 may identify an orthogonal code based on which the respective plurality of primary synchronization signals are encoded. The UE 120, when using the combination, may determine a combined primary synchronization signal using the orthogonal code and the respective plurality of primary synchronization signals, and identify a first physical broadcast channel transmission of the synchronization signal block according to a time relationship between the combined primary synchronization signal and the synchronization signal block.

As shown in FIG. 15, in some aspects, process 1500 may include determining synchronization information based at least in part on the combination of the plurality of synchronization signal blocks (block 1530). For example, the UE 120 may determine synchronization information based at least in part on the combination of the plurality of synchronization signal blocks. In some aspects, the UE 120 may determine a time of a particular slot and/or subframe of the cellular signal, a physical layer identity, a physical layer cell identity group number, a physical cell identifier, and/or similar information based at least in part on a PSS and/or SSS of the plurality of synchronization signal blocks. In some aspects, the UE 120 may determine a MIB for determining additional system information based at least in part on a PBCH of the synchronization signal blocks.

Although FIG. 15 shows example blocks of process 1500, in some aspects, process 1500 may include additional blocks, fewer blocks, different blocks, or differently arranged blocks than those depicted in FIG. 15. Additionally, or alternatively, two or more of the blocks of process 1500 may be performed in parallel.

Figure 16:
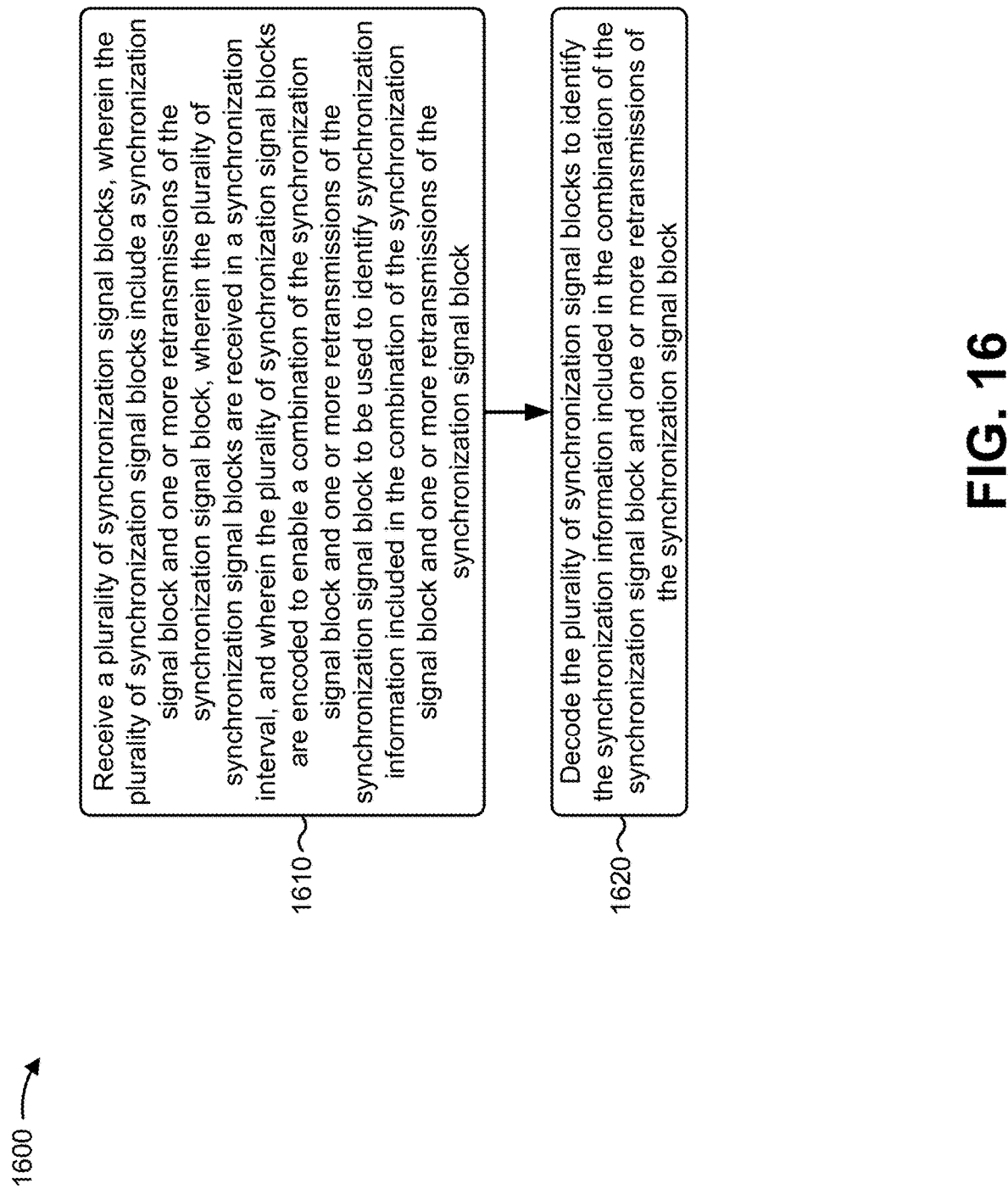
FIG. 16 is a diagram illustrating an example process performed, for example, by a wireless communication device, in accordance with various aspects of the present disclosure.

FIG. 16 is a diagram illustrating an example process 1600 performed, for example, by a wireless communication device, in accordance with various aspects of the present disclosure. Example process 1600 is an example where a wireless communication device (e.g., the UE 120) performs decoding of synchronization signal blocks to identify synchronization information included in the synchronization signal blocks.

As shown in FIG. 16, in some aspects, process 1600 may include receiving a plurality of synchronization signal blocks, wherein the plurality of synchronization signal blocks include a synchronization signal block and one or more retransmissions of the synchronization signal block, wherein the plurality of synchronization signal blocks are received in a synchronization interval, and wherein the plurality of synchronization signal blocks are encoded to enable a combination of one or more portions of the synchronization signal block and one or more portions of the one or more retransmissions of the synchronization signal block to be used to identify synchronization information included in the combination of the one or more portions of the synchronization signal block and the one or more portions of one or more retransmissions of the synchronization signal block (block 1610). For example, the UE 120 may receive a plurality of synchronization signal blocks, wherein the plurality of synchronization signal blocks include a synchronization signal block and one or more retransmissions of the synchronization signal block, wherein the plurality of synchronization signal blocks are received in a synchronization interval, and wherein the plurality of synchronization signal blocks are encoded to enable a combination of the synchronization signal block and one or more retransmissions of the synchronization signal block to be used to identify synchronization information included in the combination of the synchronization signal block and one or more retransmissions of the synchronization signal block.

In some aspects, the UE 120 may receive a plurality of synchronization signal blocks while operating in a first mode, wherein the synchronization interval in the first mode has a first periodicity greater than a synchronization interval in a second mode in which the UE 120 receives one or more synchronization signal blocks.

As shown in FIG. 16, in some aspects, process 1600 may include decoding the plurality of synchronization signal blocks to identify the synchronization information included in the combination of the synchronization signal block and one or more retransmissions of the synchronization signal block (block 1620). For example, the UE 120 may decode the plurality of synchronization signal blocks to identify the synchronization information included in the combination of the synchronization signal block and one or more retransmissions of the synchronization signal block. In some aspects, the UE 120 may determine a time of a particular slot and/or subframe of the cellular signal, a physical layer identity, a physical layer cell identity group number, a physical cell identifier, and/or similar information based at least in part on a PSS and/or SSS of the plurality of synchronization signal blocks. In some aspects, the UE 120 may determine a MIB for determining additional system information based at least in part on a PBCH of the synchronization signal blocks.

Although FIG. 16 shows example blocks of process 1600, in some aspects, process 1600 may include additional blocks, fewer blocks, different blocks, or differently arranged blocks than those depicted in FIG. 16. Additionally, or alternatively, two or more of the blocks of process 1600 may be performed in parallel.

Example processes 1200, 1500, and 1600 have been described in relation to operations that may be performed by a wireless communication device. In practice, the wireless communication device can perform operations relating to any one of processes 1200, 1300, 1400, 1500, and 1600, or any combination of two or more of these processes.

Example processes 1300 and 1400 have been described in relation to operations that may be performed by a base station. In practice, the base station can perform operations relating to any one of processes 1200, 1300, 1400, 1500, and 1600, or any combination of two or more of these processes.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method for wireless communication, comprising:
receiving, by a wireless communication device in a radio resource control (RRC) idle mode, a plurality of synchronization signal blocks within a synchronization periodicity corresponding to the RRC idle mode,
wherein the plurality of synchronization signal blocks include an original transmission of a synchronization signal block and one or more retransmissions of the synchronization signal block that are received in a synchronization interval corresponding to the RRC idle mode,
wherein the one or more retransmissions of the synchronization signal block are received within the synchronization periodicity corresponding to the RRC idle mode and configured based on the wireless communication device being in the RRC idle mode,
wherein a first two consecutive synchronization signal blocks, of the plurality of synchronization signal blocks, have a fixed relationship in time,
wherein a second two consecutive synchronization signal blocks, of the plurality of synchronization signal blocks, have a different relationship in time than the fixed relationship in time, and
wherein the synchronization periodicity is an amount of time between original transmissions of synchronization signal blocks; and
determining, by the wireless communication device, synchronization information based at least in part on one or more of the plurality of synchronization signal blocks and the fixed relationship in time.

2. The method of claim 1,
wherein the synchronization interval in the RRC idle mode has a first periodicity greater than a synchronization interval in a RRC connected mode in which the wireless communication device receives one or more synchronization signal blocks.

3. The method of claim 1, wherein one of the original transmission of the synchronization signal block or the one or more retransmissions of the synchronization signal block is received in at least one of a configured time or configured frequency resource.

4. The method of claim 1, wherein the fixed relationship in time is between the original transmission of the synchronization signal block and one of the one or more retransmissions of the synchronization signal block.

5. The method of claim 1, wherein the different relationship in time is between each consecutive pair of retransmissions of synchronization signal blocks of the plurality of synchronization signal blocks.

6. The method of claim 5, wherein the fixed relationship in time is dependent on at least one of:
frequency bands of one or more slots in which the plurality of synchronization signal blocks are present, or
data/control channel numerology of the one or more slots in which the plurality of synchronization signal blocks are present.

7. The method of claim 1, wherein determining the synchronization information comprises:
determining timing associated with at least one of the plurality of synchronization signal blocks based at least in part on timing associated with another one of the plurality of synchronization signal blocks.

8. The method of claim 1, wherein a particular synchronization signal block, of the plurality of synchronization signal blocks, includes at least one of:
a primary synchronization signal,
a secondary synchronization signal, or
a physical broadcast channel.

9. The method of claim 1,
wherein a frequency of the synchronization interval is selected for the RRC idle mode.

10. The method of claim 1, wherein information regarding the plurality of synchronization signal blocks and/or the fixed relationship in time is communicated to the wireless communication device in one or more system information blocks.

11. A method for wireless communication, comprising:
identifying, by a base station in a first mode, a plurality of synchronization signal blocks within a synchronization periodicity corresponding to a radio resource control (RRC) idle mode, wherein the plurality of synchronization signal blocks include an original transmission of a synchronization signal block and one or more retransmissions of the synchronization signal block, wherein the one or more retransmissions of the synchronization signal block are transmitted within the synchronization periodicity corresponding to the RRC idle mode and included in the plurality of synchronization signal blocks based on a wireless communication device, in a cell covered by the base station, being in the RRC idle mode, wherein a first two synchronization signal blocks, of the plurality of synchronization signal blocks, have a fixed relationship in time, wherein a second two consecutive synchronization signal blocks, of the plurality of synchronization signal blocks, have a different relationship in time than the fixed relationship in time, and wherein the synchronization periodicity is an amount of time between original transmissions of synchronization signal blocks; and transmitting, by the base station, the plurality of synchronization signal blocks within a synchronization interval in the first mode, corresponding to the RRC idle mode, and according to the fixed relationship in time, wherein the synchronization interval in the first mode has a first periodicity greater than a synchronization interval in a second mode in which the base station transmits one or more synchronization signal blocks.

12. The method of claim 11, wherein:

wherein the synchronization interval in the first mode has a first frequency greater than the synchronization interval in the second mode in which the base station is configured to transmit one or more synchronization signal blocks.

13. The method of claim 11, wherein one of the original transmission of the synchronization signal block or the one or more retransmissions of the synchronization signal block is transmitted in at least one of a configured time or configured frequency resource.

14. The method of claim 11, wherein the fixed relationship in time is between the original transmission of the synchronization signal block and one of the one or more retransmissions of the synchronization signal block.

15. The method of claim 11, wherein the different relationship in time is between each consecutive pair of retransmissions of synchronization signal blocks of the plurality of synchronization signal blocks.

16. The method of claim 15, wherein the fixed relationship in time is dependent on at least one of:

frequency bands of one or more slots in which the plurality of synchronization signal blocks are present, or data/control channel numerology of the one or more slots in which the plurality of synchronization signal blocks are present.

17. The method of claim 11, further comprising:

transmitting information regarding the plurality of synchronization signal blocks and/or the fixed relationship in time in one or more system information blocks.

18. A method for wireless communication, comprising:

encoding, by a base station, a plurality of synchronization signal blocks to be transmitted within a synchronization periodicity corresponding to a radio resource control (RRC) idle mode, wherein the plurality of synchronization signal blocks include an original transmission of a synchronization signal block and one or more retransmissions of the synchronization signal block, wherein a first two consecutive synchronization signal blocks, of the plurality of synchronization signal blocks, have a fixed relationship in time, wherein a second two consecutive synchronization signal blocks, of the plurality of synchronization signal blocks, have a different relationship in time than the fixed relationship in time, wherein the one or more retransmissions of the synchronization signal block are transmitted within the synchronization periodicity corresponding to the RRC idle mode and included in the plurality of synchronization signal blocks based on a wireless communication device, in a cell covered by the base station, being in the RRC idle mode, wherein the plurality of synchronization signal blocks are to be transmitted in a synchronization interval corresponding to the RRC idle mode, wherein the plurality of synchronization signal blocks are encoded to enable a combination of the original transmission of the synchronization signal block and the one or more retransmissions of the synchronization signal block to be used to identify synchronization information included in the combination of the original transmission of the synchronization signal block and the one or more retransmissions of the synchronization signal block, and wherein the synchronization periodicity is an amount of time between original transmissions of synchronization signal blocks; and transmitting, by the base station, the plurality of synchronization signal blocks in the synchronization interval.

19. The method of claim 18, wherein:

transmitting, by the base station, the plurality of synchronization signal blocks in the synchronization interval includes transmitting, by the base station, the plurality of synchronization signal blocks within the synchronization interval while operating in a first mode; and wherein the first mode has a first synchronization periodicity greater than a second synchronization periodicity in a second mode in which the base station transmits one or more synchronization signal blocks.

20. The method of claim 18, wherein encoding, by the base station, the plurality of synchronization signal blocks includes encoding respective physical broadcast channels of the plurality of synchronization signal blocks to enable a combination of the original transmission of the synchronization signal block and one or more retransmissions of the synchronization signal block to be used to identify an index of at least one of the original transmission of the synchronization signal block or a retransmission of the synchronization signal block.

21. The method of claim 18, wherein encoding the plurality of synchronization signal blocks comprises:

encoding respective primary synchronization signals of the plurality of synchronization signal blocks based on an orthogonal code.

22. The method of claim 21, wherein the orthogonal code includes a Barker code.

23. The method of claim 18, wherein encoding the plurality of synchronization signal blocks comprises encoding to facilitate detection of at least one peak associated with primary synchronization signals of the plurality of synchronization signal blocks.

24. A method for wireless communication, comprising:
receiving, by a wireless communication device in a radio resource control (RRC) idle mode, a plurality of synchronization signal blocks within a synchronization periodicity corresponding to the RRC idle mode,
- wherein the plurality of synchronization signal blocks include an original transmission of a synchronization signal block and one or more retransmissions of the synchronization signal block that are received in a synchronization interval corresponding to the RRC idle mode,
- wherein a first two consecutive synchronization signal blocks, of the plurality of synchronization signal blocks, have a fixed relationship in time,
- wherein a second two consecutive synchronization signal blocks, of the plurality of synchronization signal blocks, have a different relationship in time than the fixed relationship in time,
- wherein the one or more retransmissions of the synchronization signal block are received within the synchronization periodicity corresponding to the RRC idle mode and configured based on the wireless communication device being in the RRC idle mode, and
- wherein the synchronization periodicity is an amount of time between original transmissions of synchronization signal blocks;

using, by the wireless communication device, a combination of the plurality of synchronization signal blocks to identify an occurrence of synchronization information; and determining, by the wireless communication device, synchronization information based at least in part on the combination of the plurality of synchronization signal blocks.

25. The method of claim 24, wherein the plurality of synchronization signal blocks include respective index values,
- wherein the combination is to be determined based at least in part on the respective index values.

26. The method of claim 24, wherein the plurality of synchronization signal blocks include a respective plurality of physical broadcast channel transmissions and a respective plurality of primary synchronization signals; and wherein the method further comprises:
- identifying an orthogonal code based on which the respective plurality of primary synchronization signals are encoded; and wherein using the combination comprises:
- determining a combined primary synchronization signal using the orthogonal code and the respective plurality of primary synchronization signals; and
- identifying a first physical broadcast channel transmission of the synchronization signal block according to a time relationship between the combined primary synchronization signal and the synchronization signal block.

* * * * *